US010557761B2

United States Patent
Molteni et al.

(10) Patent No.: US 10,557,761 B2
(45) Date of Patent: Feb. 11, 2020

(54) FIBRE-OPTIC SENSING

(71) Applicants: SCHLUMBERGER TECHNOLOGY CORPORATION, Sugar Land, TX (US); Helen Robinson, Cambridge (GB)

(72) Inventors: Daniele Molteni, Cambridge (GB); Ian Bradford, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/573,282

(22) PCT Filed: May 13, 2016

(86) PCT No.: PCT/US2016/032231
§ 371 (c)(1),
(2) Date: Nov. 10, 2017

(87) PCT Pub. No.: WO2016/183396
PCT Pub. Date: Nov. 17, 2016

(65) Prior Publication Data
US 2018/0113037 A1    Apr. 26, 2018

(30) Foreign Application Priority Data

May 14, 2015   (GB) .................................. 1508248.0

(51) Int. Cl.
*G01L 1/24*    (2006.01)
*G01D 5/353*   (2006.01)

(52) U.S. Cl.
CPC .......... *G01L 1/242* (2013.01); *G01D 5/35361* (2013.01)

(58) Field of Classification Search
CPC ....... G01L 1/242; G01L 1/247; G01L 9/0011; G01L 11/02; E21B 47/123; G01D 5/35361; G01H 9/004
(Continued)

(56) References Cited

U.S. PATENT DOCUMENTS 4,297,887 A   11/1981  Bucaro
4,752,132 A    6/1988  Pavlath
(Continued)

FOREIGN PATENT DOCUMENTS

| GB | 2222247 A | 2/1990 |
| GB | 2442745 A | 4/2008 |
| WO | 2016010651 A1 | 1/2016 |

OTHER PUBLICATIONS

Search Report Under Section 17(5) of UK Patent Application No. 1508248.0 dated Feb. 1, 2016, 5 pages.
(Continued)

*Primary Examiner* — Octavia Hollington

(57) ABSTRACT

Processing strain measurement signals from a first measured signal representing a first received backscattered optical signal for a first sensor—the first measured signal associated with a first phase signal—and a second measured signal representing a second received backscattered optical signal for a second sensor. The second measured signal is associated with a second phase signal constituting a consolidation of the first phase signal and an additional phase signal—where the additional phase signal is unrecoverable from the first measured signal. The first phase signal is determined from the first measured signal and processed. The second phase signal is determined from the second measured signal, where the first phase signal and additional phase signal are indistinguishable in the phase domain. The second phase signal is processed to obtain the additional phase signal and (Continued)

a strain measurement signal is constructed using the processed first phase signal and additional phase signal.

11 Claims, 10 Drawing Sheets

(58) Field of Classification Search
USPC .......................................................... 73/800
See application file for complete search history.

(56) References Cited

U.S. PATENT DOCUMENTS

| | | | |
|---|---|---|---|
| 4,994,668 A | | 2/1991 | Lagakos et al. |
| 5,177,805 A * | | 1/1993 | Groger ................... G01D 5/268 |
| | | | 250/227.11 |
| 5,748,312 A | | 5/1998 | Kersey et al. |
| 6,285,806 B1 | | 9/2001 | Kersey et al. |
| 7,948,633 B2 * | | 5/2011 | Froggatt ............ G01M 11/3172 |
| | | | 356/479 |
| 9,170,149 B2 * | | 10/2015 | Hartog .................... E21B 41/00 |
| 9,476,760 B2 * | | 10/2016 | Brady ...................... G01V 1/40 |
| 9,909,903 B2 * | | 3/2018 | Lewis ...................... G01D 1/00 |
| 2006/0028637 A1 | | 2/2006 | Payton |
| 2006/0146337 A1 | | 7/2006 | Hartog |
| 2009/0103100 A1 | | 4/2009 | Froggatt et al. |
| 2009/0122319 A1 | | 5/2009 | Ronnekleiv et al. |
| 2010/0002226 A1 | | 1/2010 | Hartog |
| 2011/0320147 A1 | | 12/2011 | Brady et al. |
| 2012/0067118 A1 | | 3/2012 | Hartog et al. |
| 2012/0120389 A1 | | 5/2012 | Logan et al. |
| 2012/0179378 A1 | | 7/2012 | Duncan et al. |
| 2013/0113629 A1 * | | 5/2013 | Hartog ............... G01D 5/35303 |
| | | | 340/853.2 |
| 2013/0291643 A1 | | 11/2013 | Lumens |
| 2014/0255023 A1 | | 9/2014 | Kishida et al. |

OTHER PUBLICATIONS

Combined Search and Exam Report Under Sections 17 and 18(3) of UK Patent Application No. 1508248.0 dated Mar. 31, 2016, 8 pages.
Search Report Under Section 17 of UK Patent Application No. 1508248.0 dated Mar. 31, 2016, 2 pages.
Search Report Under Section 17 of UK Patent Application No. 1508248.0 dated Mar. 31, 2016.
Search Report and Written Opinion of International Patent Application No. PCT/US2016/032231 dated Aug. 31, 2016, 13 pages.
International Preliminary Report on Patentability of International Patent Application No. PCT/US2016/032231 dated Nov. 23, 2017.
Extended Search Report of European Patent Application No. 16793579.0, dated Dec. 17, 2018, 8 pages.

* cited by examiner

FIBRE-OPTIC SENSING

CROSS-REFERENCE TO RELATED APPLICATION

The present application claims priority to GB Application Serial No.: 1508248.0, filed May 14, 2015, which is incorporated herein by reference in its entirety

BACKGROUND

Embodiments of the present disclosure relate to a method of processing strain measurements, the method being of the type that, for example, processes phase information from two or more measured signals representing respective backscattered optical signals. Embodiments of the present disclosure also relate to an optical measurement system of the type that, for example, comprises at least two detectors arranged to generate respective measured signals in response to respective backscattered optical signals. Embodiments of the present disclosure further relate to a fibre-optic sensor apparatus of the type that, for example, comprises more than one optical fibre. Embodiments of the present disclosure also relates to a method of fibre-optic sensing, the method being of the type that, for example, comprises providing more than one optical fibre.

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. One piece of equipment which may be installed is a sensing system, such as a fibre optic based sensing system to monitor various downhole parameters that provide information that may be useful in controlling and enhancing production. However, wellbore applications are by no means the only applications where fibre optic sensing systems can be employed and, for example, fibre optic sensing systems find application in marine streamers.

Typically, a fibre optic sensor of the fibre optic sensing system comprises a length of optical fibre that is interrogated by launching pulses of light into the optical fibre. To measure vibration or strain, distributed fibre optic sensing systems measure, for example, the amplitude of Rayleigh backscatter returned from the fibre optic sensor when excited by the pulses of light. Such sensing systems are useful for tracking the movement of certain events and/or classifying various types of disturbances. However, for some applications, phase-related measurements can be used to determine other parameters.

One known fibre optic sensing system is a Distributed Vibration Sensor (DVS) system, for example a heterodyne DVS (hDVS) system. In such a sensing system, dynamic range is an important system parameter. In this respect, the dynamic range of a system interrogating a single fibre is sometimes insufficient for some applications, for example active and passive seismic measurement. In particular, a single fibre having a certain amplitude sensitivity can be inadequate where the fibre is exposed to acoustic waves of different amplitudes.

Due to the optical fibre having a single amplitude sensitivity, where a mixture of acoustic signals of different amplitudes are incident upon the optical fibre at a given location on the fibre, the acoustic signals of higher amplitude can cause signal saturation in the processing of phase data generated by acquisition circuitry of an hDVS unit in response to the mixture of acoustic signals sensed by the optical fibre. Consequently, it is not possible to apply certain processing techniques to the phase data generated by the hDVS unit in order to reconstruct a time-varying strain signal associated with a location along the optical fibre. For example, it is not possible to reconstruct the strain signal from using a so-called "phase unwrapping" processing technique, because the strain signal is aliased in the phase domain as a result of the influence of the rate of change of the acoustic signals. The aliasing is caused by the optical signal being sensed having a phase variation that is wrapped multiple times, the number of times being indeterminable by the hDVS unit. The rate of change of a signal, for example the phase of the optical signal, depends on its amplitude and frequency. For signals with the same frequency or with comparable frequency component content, the rate of change is primarily affected by their amplitude.

United States Patent Publication No. 2013/0291643 discloses a directionally sensitive Distributed Acoustic Sensing (DAS) fibre optical assembly comprising a pair of optical fibres, each having different directional acoustic sensitivities so that directions of acoustic signals relative to the optical fibres can be detected. However, this document does not address the problem of signal aliasing in the phase domain.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to a first aspect of the present disclosure, a method of processing strain measurement signals is provided. The method comprising receiving a first measured signal representing a first received backscattered optical signal in respect of a first sensor. The first measured signal includes a first phase signal. A second measured signal representing a second received backscattered optical signal in respect of a second sensor is also received. The second measured signal includes a second phase that constitutes a consolidation of the first phase signal and an additional phase signal, where the additional phase signal is unrecoverable from the first measured signal. Determining the first phase signal from the first measured signal and processing the determined first phase signal. Determining the second phase signal from the second measured signal. The first phase signal and the additional phase signal are indistinguishable from one another in the phase domain. Processing the second phase signal to obtain the additional phase signal. Constructing an estimate of a strain measurement signal using the processed first phase signal and the additional phase signal.

The first phase signal may be processed using a predetermined processing technique and the second phase signal may be processed using the predetermined processing technique.

The processing of the first phase signal may be a phase unwrapping technique that yields unwrapped first phase signal and the processing of the second phase signal may be the phase unwrapping technique.

The phase unwrapping technique applied to the second phase signal may employ an a priori phase signal. The a priori phase signal may be the unwrapped first phase signal generated and associated with the first measured signal.

The first measured signal may have a first gain associated therewith and the second measured signal may have a second gain associated therewith, wherein the second gain may be larger than the first gain. The second gain may be a multiple of the first gain.

Processing of the second phase signal may comprise subtracting the a priori phase signal from the determined second phase signal.

According to a second aspect of the present disclosure, there is provided a method of reconstructing a strain signal, the method comprising the method of processing strain measurements as set forth above in accordance with the first aspect of the disclosure.

The construction of the strain measurement signal may comprise summation of a first estimate of the strain measurement signal corresponding to the first phase signal and a second estimate of the strain measurement signal corresponding to the additional phase signal.

According to a third aspect of the present disclosure, there is provided an optical measurement system. The optical measurement system includes a first optical signal converter arranged to receive a first backscattered optical signal in respect of a first optical sensor and in response to generate a first measured signal. The first measured signal includes an associated first phase signal. A second optical signal converter is arranged to receive a second backscattered optical signal in respect of a second optical sensor and in response to generate a second measured signal. The second measured signal includes an associated second phase signal that constitutes a consolidation of the first phase signal and an additional phase signal, where the additional phase signal is unrecoverable from the first measured signal. A processor is arranged to support a phase detector, which determines the first phase signal from the first measured signal. A phase processing unit supported by the processor processes the first phase signal and the phase detector determines the second phase signal from the second measured signal, where the first phase signal and the additional phase signal are indistinguishable from one another in the phase domain. The phase processing unit is arranged to process the second phase signal to obtain the additional phase signal. A signal combiner is arranged to construct an estimate of a strain measurement signal using estimated strain signals respectively derived from the processed first phase signal and the additional phase signal.

The phase processing unit may be a phase unwrapper. The phase unwrapper may be arranged to use an a priori phase signal.

The first optical sensor may have a first gain associated therewith and the second optical sensor may have a second gain associated therewith; the second gain may be larger than the first gain. The second gain may be substantially a multiple of the first gain.

The first optical sensor may be a first optical fibre sensor and/or the second optical sensor may be a second optical fibre sensor.

The processing resource may be arranged to subtract the a priori phase signal from the determined second phase signal.

According to a fourth aspect of the present disclosure, a fibre-optic sensor apparatus comprises a first optical fibre, a second optical fibre having a same direction of acoustic sensitivity with the first optical fibre, wherein the first optical fibre has a first magnitude sensitivity associated therewith and the second optical fibre has a second magnitude sensitivity associated therewith that is different to the first magnitude sensitivity.

The apparatus may further comprise a measurement processing unit operably coupled to the first optical fibre and the second optical fibre. The measurement processing unit may be arranged to measure strain.

According to a fifth aspect of the present disclosure, there is provided a method of fibre-optic sensing, the method comprising: providing a first optical fibre having a first magnitude sensitivity associated therewith; providing a second optical fibre and arranging the second optical fibre to have a same direction of acoustic sensitivity as the first optical fibre; arranging the second optical fibre to have a second magnitude sensitivity that is different to the first magnitude sensitivity.

The method may further comprise measuring a first backscattered optical signal in respect of the first optical fibre and a second backscattered optical signal in respect of the second optical fibre.

The method may further comprise: using a first measure of the first backscattered optical signal and a second measure of the second backscattered optical signal in order to measure strain.

According to a sixth aspect of the present disclosure, there is provided a method of processing strain measurements, the method comprising: receiving a first measurement signal in respect of a plurality of contiguous time intervals and associated with a first sensor; generating a first unwrapped phase signal in respect of the first measurement signal; receiving a second measurement signal in respect of the plurality of contiguous time intervals and associated with a second sensor; generating a second unwrapped phase signal in respect of the second measurement signal; selecting a phase signal fragment in respect of a first time interval of the plurality of contiguous time intervals from one of the first unwrapped phase signal associated with the first sensor and the second unwrapped phase signal associated with the second sensor in accordance with a predetermined criterion; using the selected phase signal fragment to construct a strain measurement signal.

The predetermined criterion may be signal saturation. The predetermined criterion may be least saturation.

The method may further comprise measuring the signal saturation of the first unwrapped phase signal associated with the first sensor in respect of the first time interval.

The method may further comprise: measuring power of the first unwrapped phase signal in respect of frequency components selected with respect to a predetermined frequency band and in respect of the first time interval.

The method may further comprise: measuring the signal saturation of the second unwrapped phase signal in respect of the first time interval of the plurality of contiguous time intervals in response to the measurement of the signal saturation in respect of the first unwrapped phase signal and the first time interval being indicative of the first unwrapped phase signal being saturated in respect of the first time interval.

The power of the second unwrapped phase signal may be measured in respect of frequency components selected with respect to the predetermined frequency band.

The predetermined frequency band may be between about 500 Hz and about 1000 Hz.

The method may further comprise: measuring with respect to the predetermined frequency band by filtering the first unwrapped phase signal in respect the predetermined frequency band.

The method may further comprise: measuring with respect to the predetermined frequency band by filtering the second unwrapped phase signal in respect of the predetermined frequency band.

The method may further comprise: determining whether the first unwrapped phase signal is saturated in respect of the first time interval by comparing the measured power of the first unwrapped phase signal with respect to a predetermined power threshold.

The method may comprise: determining whether the second unwrapped phase signal is saturated in respect of the first time interval by comparing the measured power of the second unwrapped phase signal with respect to the predetermined power threshold.

The method may further comprise: selecting another phase signal fragment in respect of a second time interval of the plurality of contiguous time intervals from one of the first unwrapped phase signal associated with the first sensor and the second unwrapped phase signal associated with the second sensor in accordance with the predetermined criterion. The second time interval may immediately follow the first time interval.

According to a seventh aspect of the present disclosure, there is provided an optical measurement system comprising: a first optical signal converter arranged to generate a first measurement signal in respect of a plurality of contiguous time intervals and associated with a first sensor; a second optical signal converter arranged to generate a second measurement signal in respect of the plurality of contiguous time intervals and associated with a second sensor; a phase signal generator arranged to generate a first unwrapped phase signal in respect of the first measurement signal and a second unwrapped phase signal in respect of the second measurement signal; a signal analyser arranged to select a phase signal fragment in respect of a first time interval of the plurality of contiguous time intervals from one of the first unwrapped phase signal associated with the first sensor and the second unwrapped phase signal associated with the second sensor in accordance with a predetermined criterion; a signal combining unit arranged to use the selected phase signal fragment to construct a strain measurement signal.

The predetermined criterion may be signal saturation. The predetermined criterion may be least saturation.

The signal analyser may be arranged to measure the signal saturation of the first unwrapped phase signal associated with the first sensor in respect of the first time interval. The signal analyser may be arranged to measure power of each the first phase signal in respect of frequency components selected with respect to a predetermined frequency band and in respect of the first time interval.

The signal analyser may be arranged to measure the signal saturation of the second unwrapped phase signal in respect of the first time interval of the plurality of contiguous time intervals in response to the measurement of the signal saturation in respect of the first phase signal and the first time interval may be indicative of the first unwrapped phase signal being saturated in respect of the first time interval.

The signal analyser may be arranged to measure power of the second unwrapped phase signal in respect of frequency components selected with respect to the predetermined frequency band.

The predetermined frequency band may be between about 500 Hz and about 1000 Hz.

The signal analyser may be arranged to measure with respect to the predetermined frequency band by filtering the first unwrapped phase signal in respect of the predetermined frequency band.

The signal analyser may be arranged to measure with respect to the predetermined frequency band by filtering the second unwrapped phase signal in respect of the predetermined frequency band.

The signal analyser may be arranged to determine whether the first unwrapped phase signal is saturated in respect of the first time interval by comparing the measured power of the first unwrapped phase signal with respect to a predetermined power threshold.

The signal analyser may be arranged to determine whether the second unwrapped phase signal is saturated in respect of the first time interval by comparing the measured power of the second unwrapped phase signal with respect to the predetermined power threshold.

The signal analyser may be arranged to select another phase signal fragment in respect of a second time interval of the plurality of contiguous time intervals from one of the first unwrapped phase signal associated with the first sensor and the second unwrapped phase signal associated with the second sensor in accordance with the predetermined criterion. The second time interval may immediately follow the first time interval.

It is thus possible to provide a method, system and apparatus capable of providing phase signal estimates despite aliasing of time-varying phase signals attributable to a mixture of large and small rates of signal variation. The method, system and apparatus also enable a strain signal to be reconstructed in respect of a wide range of strain rates of change, thereby increasing the dynamic range of signals that can be measured by the measurement apparatus. In this respect, the lower sensitivity of some of the optical fibres used is effectively caused by a limited dynamic range of the interrogation system itself. As fibre optic acoustic sensors have a limited dynamic range of for example 60 dB, all signals below 60 dB relative to a maximum signal strength would be lost in noise of the detection system, attributable for example to laser and thermal noise. The method, system and apparatus supports a larger signal dynamic range by combining fibres having different contiguous sensitivity ranges. Also, since different optical fibres have different scatter responses, combining measurements made with these optical fibres results in improved signal linearity and quality.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

Figure 1:
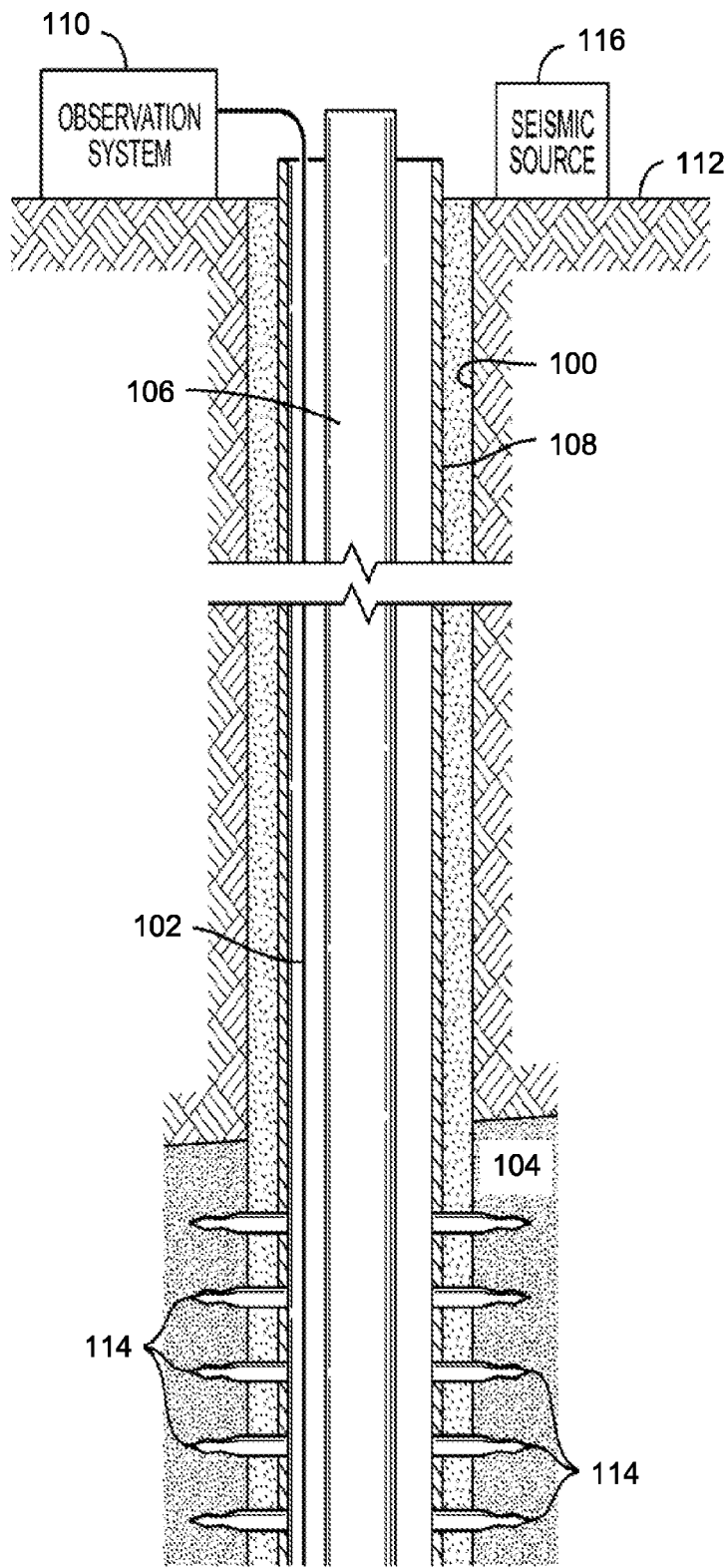
FIG. 1 is a schematic diagram of a wellbore containing a fibre optic sensor, in accordance with some embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In some embodiments, the apparatus, systems and techniques described herein may be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system may comprise one or more of various components or subsystems, which include without limitation: casing, tubing, control lines (electric, fibre optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well may communicate with systems or sub-systems that are located at the surface. The surface systems or sub-systems in turn may communicate with other surface systems, such as systems that are at locations remote from the well.

Referring to FIG. 1, an optical sensor unit, for example a fibre-optic sensor unit 102, may be deployed in a wellbore 100 to observe physical parameters associated with a region of interest 104 in a geological formation. In some embodiments, the fibre-optic sensor 102 may be deployed through a control line and may be positioned in an annulus between a production tubing 106 and a casing 108. As will be described later herein in further detail, the fibre-optic sensor 102 comprises more than one optical sensing fibre for, for example, the purpose of measuring strain. An observation system 110, which includes the interrogation, detection and acquisitions systems for a phase coherent-detection Optical Time Domain Reflectometry (OTDR) system described later herein, may be located at a surface 112 and coupled to the fibre-optic sensor 102 to transmit probe pulses, detect returned backscatter signals, and acquire phase information to determine the parameters of interest, for example strain or vibration parameters, in the manners described later herein.

In order to reach the region of interest 104, the wellbore 100 is drilled through the surface 112 and the casing 108 is lowered into the wellbore 100. Perforations 114 are created through the casing 108 to establish fluid communication between the wellbore 100 and the formation in the region of interest 104. The production tubing 106 is then installed and set into place such that production of fluids through the tubing 106 can be established. Although a cased well structure is shown, it should be understood that embodiments set forth herein are not limited to this illustrative example. Uncased, open hole, gravel packed, deviated, horizontal, multi-lateral, deep sea or terrestrial surface injection and/or production wells (among others) may incorporate the phase coherent-detection OTDR system.

The fibre optic sensor 102 for the OTDR system may be permanently installed in the well or can be removably deployed in the wellbore 100, such as for use during remedial operations. In many applications, strain and pressure measurements obtained from the region of interest 104 using a phase coherent-detection OTDR system may provide useful information that may be used to increase productivity. For instance, the measurements may provide an indication of the characteristics of a production fluid, such as flow velocity and fluid composition. This information then can be used to implement various types of actions, such as preventing production from water-producing zones, slowing the flow rate to prevent so-called "coning", and controlling the injection profile, so that more oil is produced as opposed to water. The strain and pressure measurements can also provide information regarding the properties of the surrounding formation so that the phase coherent-detection OTDR system can be used for seismic surveying applications.

In this respect, a phase coherent-detection OTDR system can provide substantial advantages for seismic exploration and seismic production monitoring applications. For instance, seismic surveying applications, and particularly downhole seismic monitoring applications, employ seismic sources, for example a seismic source 116, to generate seismic signals for detection by an acoustic sensor, such as the fibre optic sensor 102, which may be configured to respond to acoustic forces incident along its length and which may be deployed downhole, for example in the wellbore 100. Two different types of seismic sources are generally employed: impulsive sources, for example air guns or explosives, which may be either deployed at the surface 112 or downhole in the wellbore, and vibroseis sources.

A vibroseis source is generally implemented by one or more trucks or vehicles that move across the surface and, when stationary, shake the ground in accordance with a controlled time/frequency function, which typically is a linearly varying frequency or "chirp." When impulsive sources are used, optical signals captured by the fibre optic sensor 102 during seismic monitoring can be easily cross-correlated with the original acoustic signal incident upon the fibre optic sensor 102, since the firing of the impulsive source is a discrete event. However, for vibroseis sources, the captured signals must be linearly related to the acoustic signals incident upon the fibre optic sensor 102 in order to perform the cross-correlation between the captured signals and the original chirp signal. The COTDR systems described above can be used to measure or estimate strain through the estimation of the phase of backscattered light. Yet further, because of the relationship between the acoustic signals that impart a strain on the sensor and the resulting optical signal, beam-forming methods can be employed to filter the incoming acoustic waves by angle, thus providing for more precise characterization of the properties of the surrounding geologic formation.

Embodiments of the phase coherent-detection OTDR systems set forth herein can also be employed in applications other than hydrocarbon production and seismic or geologic surveying and monitoring. For instance, embodiments of the phase coherent-detection OTDR systems can be implemented in intrusion detection applications or other types of applications where it may be desirable to detect disturbances to a fibre optic cable. As another example, embodiments of the phase coherent-detection OTDR systems can be employed in applications where the fibre optic sensor is deployed proximate an elongate structure, such as a pipeline, to monitor and/or detect disturbances to or leakages from the structure. In another embodiment, the fibre optic sensor can be used in conjunction with a marine streamer.

The embodiments mentioned above employ coherent-detection OTDR techniques (generally, launching a narrow-band optical pulse into an optical fibre and mixing the Rayleigh backscattered light with a portion of the continuous light coming directly from the optical source) combined with phase measurements to measure a parameter of interest in the region in which the optical fibre is deployed. In some embodiments, as described later herein, the measured phases may be differentiated over a selected differentiation interval and the time variation of these differentiated phase signals may be a measure of the parameter of interest. In various other embodiments, multiple interrogation frequencies may be used to enhance the linearity of the measurement and to reduce the fading that otherwise may be present in a coherent-detection OTDR system that employs a single interrogation frequency.

Figure 2:
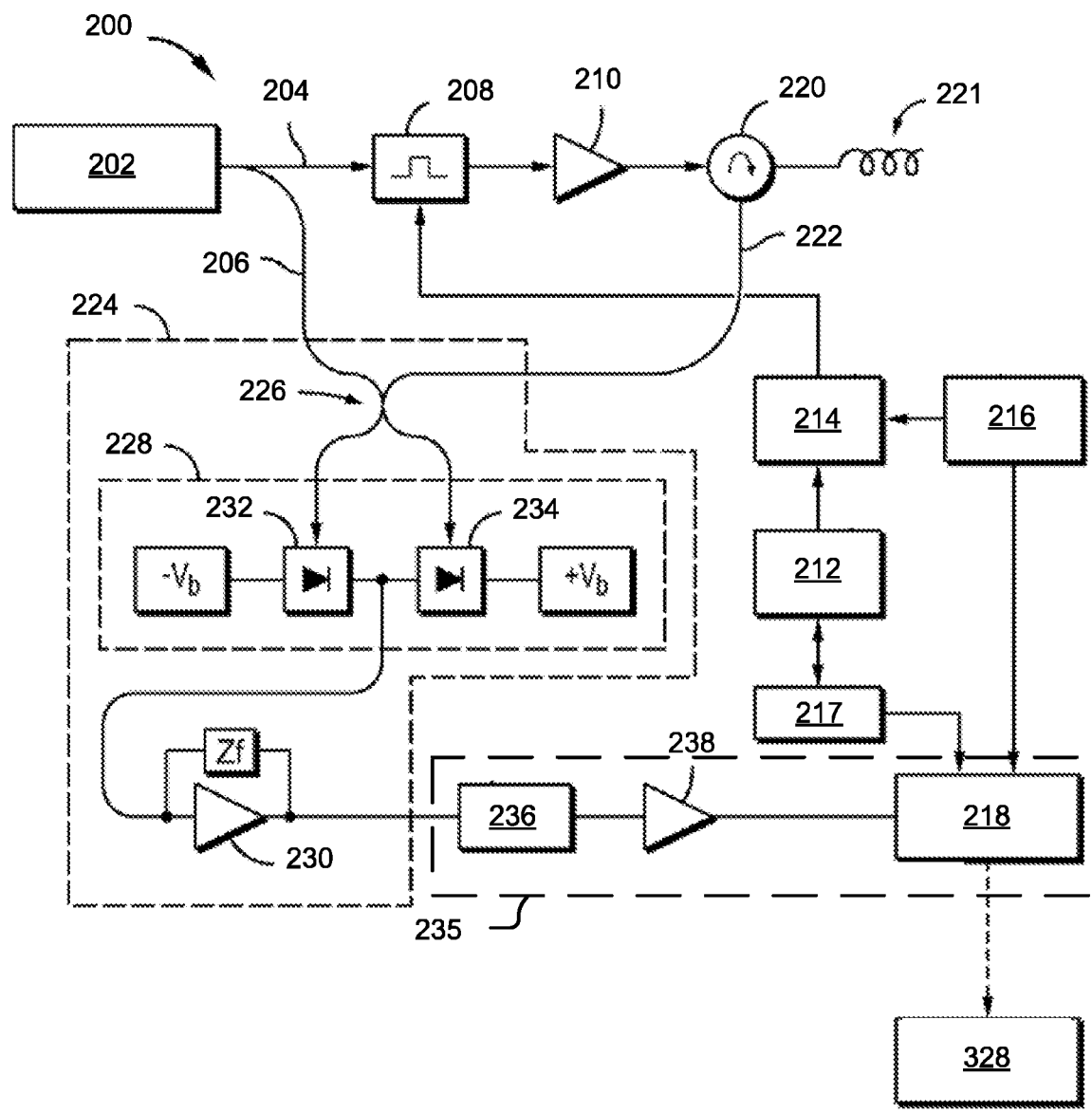
FIG. 2 is a schematic diagram of a heterodyne distributed vibration sensing system employing the fibre optic sensor of FIG. 1.

Turning to FIG. 2, an exemplary arrangement of a phase-measuring OTDR system 200 that employs heterodyne coherent detection will now be described initially, for the sake of ease of understanding, with reference to a single optical sensor, for example a single optical sensing fibre 221 of the optical sensor unit 102. The system 200 includes an optical source 202, which can be a narrowband source such as a distributed feedback fibre laser, which generally provides the narrowest available spectrum of lasers for which the emission wavelength can be selected over a wide range. The output of the source 202 is divided into a local oscillator path 206 along which a local oscillator signal propagates and an interrogation signal path 204. In the path 204, a modulator 208 modulates an optical signal into a probe pulse, which additionally may be amplified by an amplifier 210 prior to being launched into the sensing fibre 221 via a first circulator 220. In this example, the probe pulse and the local oscillator signal are at different carrier frequencies. In this regard, a frequency shift is introduced in the probe pulse, which may for instance be achieved by selecting the modulator 208 to be of the acousto-optic type, where the pulsed output is taken from the first diffraction order, or higher of the modulator 208.

All orders other than zero of the output of such devices are frequency-shifted (up or down) with respect to the input light by an amount equal to (for first order) or integer multiple of (for second order or higher) the radio-frequency electrical input applied to them. Thus, in this example, an Intermediate Frequency (IF) source 212, for example a radio frequency oscillator, provides a driving signal for the modulator 208, gated by an IF gate 214 under the control of a trigger pulse 216. The optical pulse thus emitted by the modulator 208 is frequency-shifted relative to the light input to the modulator 208 from the optical source 202, and therefore also relative to the local oscillator signal in the path 206.

The trigger 216 synchronizes, in this example, the generation of the probe pulse with an acquisition by the system 200 of samples of the backscatter signal generated by the sensing fibre 221, from which the phase (and indeed the amplitude) information may be calculated. In various embodiments, the trigger 216 can be implemented as a counter within a sampler 218 that determines the time at which the next pulse should be generated by the modulator 208. At the determined time, the trigger 216 causes the IF gate 214 to open simultaneously with initiating acquisition by the sampler 218 of a pre-determined number of samples of the amplitude information. In other embodiments, the trigger 216 can be implemented as a separate element that triggers initiation of the probe pulse and acquisition of the samples in a time-linked manner. For instance, the trigger 216 can be implemented as an arbitrary waveform generator that has its clock locked to the clock of the sampler 218 and which generates a short burst at the IF rather than the arrangement shown of an IF source 212 followed by a gate 214.

In other arrangements, the frequency difference between the probe pulse launched into the sensing fibre 221 and the local oscillator signal in the path 206 may be implemented in manners other than by using the modulator 208 to shift the frequency of the probe pulse. For instance, a frequency shift may be achieved by using a non-frequency-shifting modulator in the probe pulse path 204 and then frequency-shifting (up or down) the light prior to or after the modulator 208. Alternatively, the frequency shifting may be implemented in the local oscillator path 206.

As mentioned above, the system 200 also comprises the first circulator 220 that passes the probe pulse into the sensing fibre 221 and diverts returned light to a first return optical fibre 222, where it is directed to a coherent-detection system 224 that generates a mixed output signal. In an exemplary implementation, the coherent-detection system 224 includes a directional coupler 226, a detector 228 and a receiver 230. The directional coupler 226 combines the returned light in the first return optical fibre 222 with the local oscillator light in the path 206. The output of the coupler 226 is directed to the detector 228. In this example, the detector 228 is implemented as a pair of photodetectors 232, 234, for example photodiodes, which are arranged in a balanced configuration. The use of a photodetector pair 232, 234 can be particularly useful, because it makes better use of the available light and can cancel the light common to both outputs of the coupler 226 and, in particular, common-mode noise. The detector 228, or photodetector pair 232, 234, provide(s) a current output centred at the IF that is passed to the receiver 230, for example a current input preamplifier or a transimpedance amplifier, which provides the mixed output signal, for example an IF signal.

A sampling module 235 comprises a filter 236 operably coupled to an output of the receiver 230 and can be used to select a band of frequencies around the IF and the filtered signal can then be amplified by an amplifier 238 of the sampling module 235 and sent to the sampler 218, which in this example is a high-speed analogue-to-digital converter (ADC) 218 driven by a clock 217 and triggered by the trigger source 216. The clock 217, which controls the sampling rate of the ADC 218, can be derived from the same master oscillator that is used to derive the IF source 212 in order to ensure phase coherence between the backscatter signal and the timing of the digital samples. An output of the ADC 218 is operably coupled to an acquisition apparatus 328.

As an example, commercially available acousto-optic modulator drive frequencies include 40, 80 or 110 MHz. The resulting IF signal can conveniently be sampled at 250 Msample/s, a sampling frequency for which a number of high quality 12-bit analogue-to-digital converters (ADCs) are available, for example from Maxim Integrated Circuits (MAX1215) or Analog Devices (AD9626 or AD9630). ADCs with higher sampling rates are available commercially from companies such as Maxim Integrated Circuits or National Semiconductor, and sampling rates in excess of 2 GSPS (giga samples per second) can be purchased off the shelf, with somewhat lower resolution (8-10 bit). In this example, the sampling rate of the ADC 218 is set to be several times the IF frequency, for example 4-5 times the IF frequency, but techniques known as sub-sampling, where this condition is not met can also be employed. Thus, two frequencies are used in the system 200: one to drive the ADC 218 and the other for the IF source 212. Both frequencies can be derived from a common oscillator using one or more phase-locked loops and/or frequency dividers. An alternative approach is to drive the modulator 208 from an arbitrary waveform generator that synthesises the RF signal to drive the modulator 208 and that itself is synchronised in its clock to the sampling clock 217. The digital data stream thus generated by the ADC 218 may be processed by a processing system on the fly to extract a phase estimate from the incoming data. Alternatively, the data may be stored in a data storage unit (not shown) for later processing.

As mentioned above, the description of the phase-measuring OTDR system 200 has been confined initially to the context of a single sensing fibre 221. However, extending this example further to the interrogation of multiple sensing fibres of different sensitivities, a splitter can be provided to couple the source 202 and the modulator 208 to separate sensing fibres having respective circulators disposed between the splitter and the sensing fibre. In this regard, the source 202 and the modulator 208 can be shared by the plurality of sensing fibres of the fibre-optic sensor 102, as well as the IF source 212, the gate 214, the trigger 216 and the clock 217.

Figure 3:
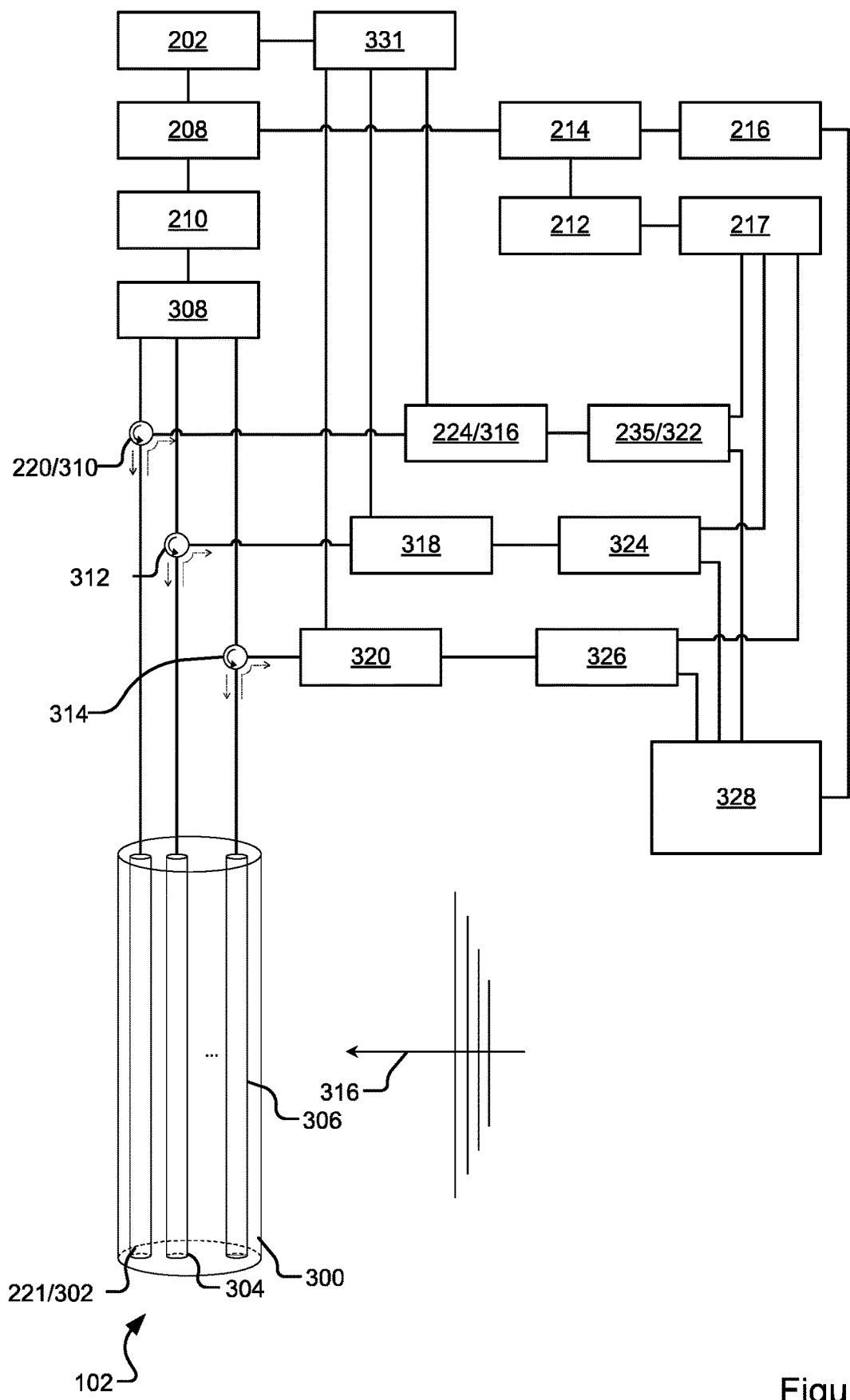
FIG. 3 is a schematic diagram of the fibre optic sensor of FIG. 1 in greater detail.

However, the coherent detection system 224 and the sampling module 235 are provided, in this example, for each of the plurality of sensing fibres. In this respect, and referring to FIG. 3, the optical sensor unit 102 comprises a cable 300 having a housing for containing a plurality of optical sensors, for example the first optical fibre 221/302, a second optical fibre 304 and a third optical fibre 306. Although, in this example, only three optical fibres are described, the skilled person will appreciate that the optical fibre sensor 102 may comprise fewer or a greater number of optical fibres for sensing purposes. The direction of sensitivity of the first optical fibre 302 is the same as the direction of the acoustic sensitivity of the second optical fibre 304. Where more than two optical fibres are employed, for example as in the present example, the remaining optical fibres, for example the third optical fibre 306, has/have the same direction of acoustic sensitivity as the first and second optical fibres 302, 304.

The first optical fibre 302 has a first transfer function, $f_1(\bullet)$, associated therewith, the second optical fibre 304 has a second transfer function, $f_2(\bullet)$, associated therewith, and the third optical fibre 306 has a third transfer function, $f_3(\bullet)$, associated therewith. If, as suggested above, a greater number of optical fibres is employed to form the optical fibre sensor 102, then an $i^{th}$ optical fibre would have an $i^{th}$ transfer function, $f_i(\bullet)$, associated therewith.

As will be described in further detail later herein, in this example, the first, second and third transfer functions, $f_1(\bullet)$, $f_2(\bullet)$, $f_3(\bullet)$, represent fibre sensitivity in terms of a relationship between phase variation and applied strain in respect of a given longitudinal portion along each of the first, second and third optical fibres 302, 304, 306. In this respect, the responses of the first, second and third optical fibres 302, 304, 306 can be defined, for example mechanically, by manufacturing the fibres so as to differ by one or more of, for example, the following characteristics: coating, material, outer layer, and/or gel.

As described previously, the optical source 202 is operably coupled to the modulator 208, which is operably coupled to the amplifier 210. A first coupler 308 has an input operably coupled to an output of the amplifier 210. A first output of the first coupler 308 is operably coupled to the first optical fibre 302 via the first circulator 220/310, the first output of the first coupler 308 being coupled to a first port of the first circulator 310 and a second port of the first circulator 310 being coupled to the first optical fibre 302. A second output of the first coupler 308 is operably coupled to the second optical fibre 304 via a second circulator 312, the second output of the first coupler 308 being coupled to a first port of the second circulator 312 and a second port of the second circulator 312 being coupled to the second optical fibre 304. A third output of the first coupler 308 is operably coupled to the third optical fibre 306 via a third circulator 314, the third output of the first coupler 308 being coupled to a first port of the third circulator 314 and a second port of the third circulator 314 being coupled to the third optical fibre 306.

A third port of the first circulator 310 is operably coupled to the first coherent detection system 224/316 in the manner already described above in relation to FIG. 2. A third port of the second circulator 312 is operably coupled to a second coherent detection system 318 and a third port of the third circulator 314 is operably coupled to a third coherent detection system 320, both in an analogous manner to that described above in relation to the first circulator 310.

As described above, the first coherent detection system 316 is coupled to the first sampling module 235/322 as described above in relation to FIG. 2. The second coherent detection system 318 is coupled to a second sampling module 324, and the third coherent detection system 320 is coupled to a third sampling module 326. The second and third sampling modules 324, 326 are structured in a like manner as the first sampling module 322. In this respect, they both respectively comprise a filter coupled to an amplifier, the amplifier being coupled to an ADC in the manner described above in relation to FIG. 2. In this example, the combination of a coherent detection system and a corresponding sampling module constitutes an optical signal converter.

The respective outputs of the first, second and third sampling modules 322, 324, 326 are each operably coupled to the acquisition apparatus 328, consistent with the coupling of the first sampling module 235/322 described in FIG. 2.

In common with the example of FIG. 2, the modulator 208 is coupled to the IF gate 214, which is coupled to the IF source 212 and the trigger 216. The trigger 216 is coupled to the acquisition apparatus 328. In this example, the IF source 212 is coupled to the clock 217, which has three outputs: a first output of the clock 217 is coupled to the first sampling module 322, consistent with the example of FIG. 2, a second output of the clock 217 is coupled to the second sampling module 324, and a third output of the clock 217 is coupled to the third sampling module 326.

The optical source 202 is also coupled to an input of a second coupler 331, a first output of the second coupler 331 being coupled to the first coherent detection system 316 as described above in relation to FIG. 2. A second output of the second coupler 331 is coupled to the second coherent detection system 318 and the third output of the second coupler 331 is coupled to the third coherent detection system 320.

The acquisition apparatus 328 may be provided using a suitable processor, for example a general purpose processor or microcontroller, and associated memory device(s) for performing processing functions, such as normalisation of the acquired data, data averaging, storage in the data storage unit (not shown), signal reconstruction and/or display to a user or operator of the system.

Figure 4:
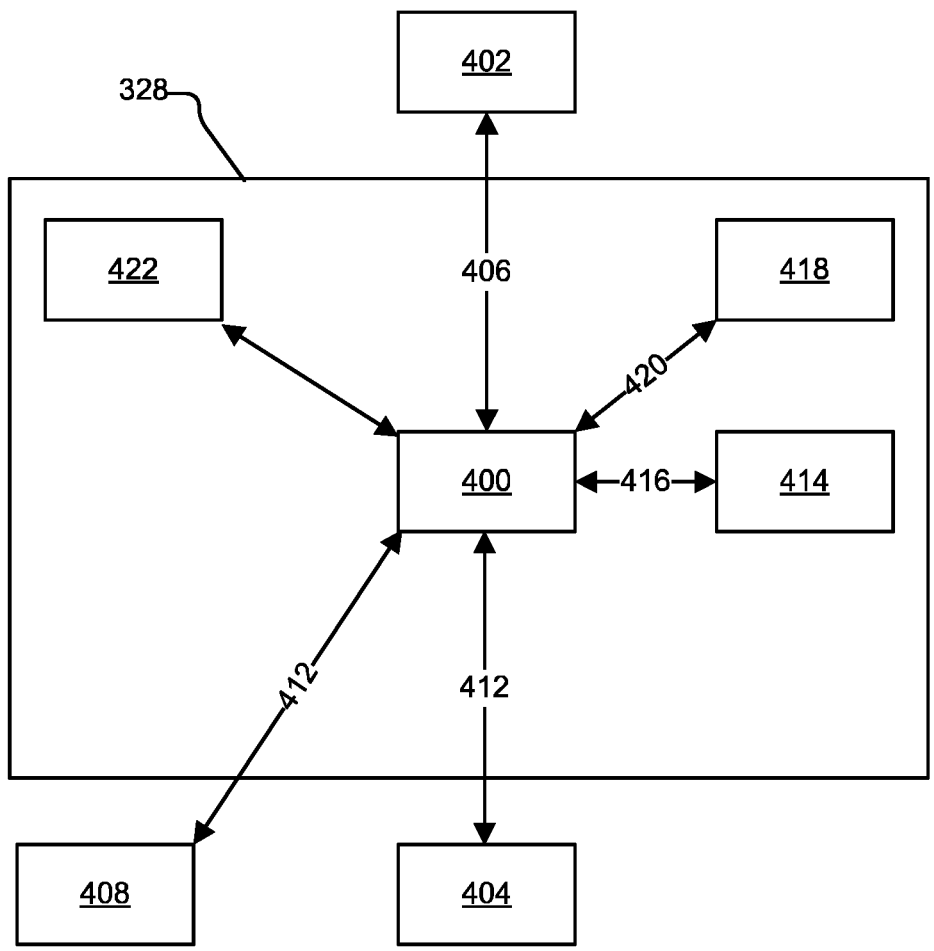
FIG. 4 is a schematic diagram of an acquisition apparatus of FIG. 3, in accordance with some embodiments of the present disclosure.

Referring to FIG. 4, it should be appreciated that the block diagram of the acquisition apparatus 328 is not inclusive of all components of such an apparatus, but is only representative of many example components. The apparatus 328 is located within a housing (not shown). The apparatus 328 can be, for example, a general-purpose computing apparatus, for example a Personal Computer (PC), or any other suitable computing device. The apparatus 328 includes, in this example, a processing resource, for example a processor 400, coupled to an input device 402 via an input device interface (not shown) and a display device, for example a display screen 404 via a display driver (also not shown). Although reference is made here to the input device 402 in the singular, the skilled person should appreciate that the input device 402 represents any number of input devices, including a keyboard device, mouse, trackball, voice input device, touch panel and/or any other known input device utilized to input information. Likewise, the display screen 404 can include any type of display screen, for example a Liquid Crystal Display (LCD). As is common with such computing apparatus, the processor 400 supports a Graphical User Interface (GUI) that operates in conjunction with the input device 402 and the display screen 404.

The processor 400 is operably coupled to and capable of receiving input data from input device 402 via a connection 406, and operatively connected to the display screen 404 and optionally to an output device 408, via respective output connections 412, to output information thereto. The output device 408 is, for example, an audible output device, such as a loudspeaker. The processor 400 is operably coupled to a memory resource 414 via internal connections 416, for example address and data buses, and is further adapted to receive/send information from/to input/output (I/O) ports 418 via connection 420. In this example, the ports 418 are operably coupled to the first, second and third sampling modules 322, 324, 326 of FIG. 3. The memory resource 414 comprises, for example, a volatile memory, such as a Random Access Memory (RAM) and a non-volatile memory, for example a digital memory, such as a flash memory. A storage device, for example a hard disc drive 422, or a solid state drive, is also operably coupled to the processor 400 to provide high-capacity data storage capabilities.

Figure 5:
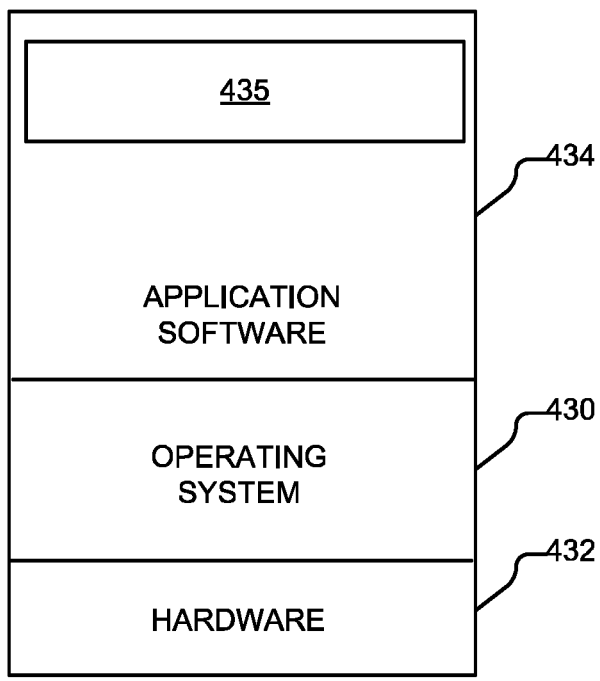
FIG. 5 is a schematic diagram of an architectural stack supported by the apparatus of FIG. 4.

Turning to FIG. 5, the processor 400 of the acquisition apparatus 328 loads an operating system 430 from the memory resource 414 and/or the hard drive 422 for execution by functional hardware components 432, which provides an environment in which application software 434 can run. The operating system 430 serves to control the functional hardware components 432 and resides between the application software 434 and the functional hardware components 432. The application software 434 provides an operational environment including the GUI mentioned above that supports core functions of the acquisition apparatus 328, for example a strain signal reconstruction module 435.

As mentioned above, the operational environment supports application software. In one example set forth herein, the performance of strain signal reconstruction uses the application software 434. However, the skilled person will appreciate that the methods set forth herein need not be implemented in software and other hardware-based techniques can be employed, for example use of programmable hardware, such as Field Programmable Gate Arrays (FPGAs) or customizable integrated circuits, such as Application-Specific Integrated Circuits (ASICs). It will, nevertheless, be apparent to the skilled person that a software-oriented approach can be more elegant than a pure hardware approach.

Figure 6:
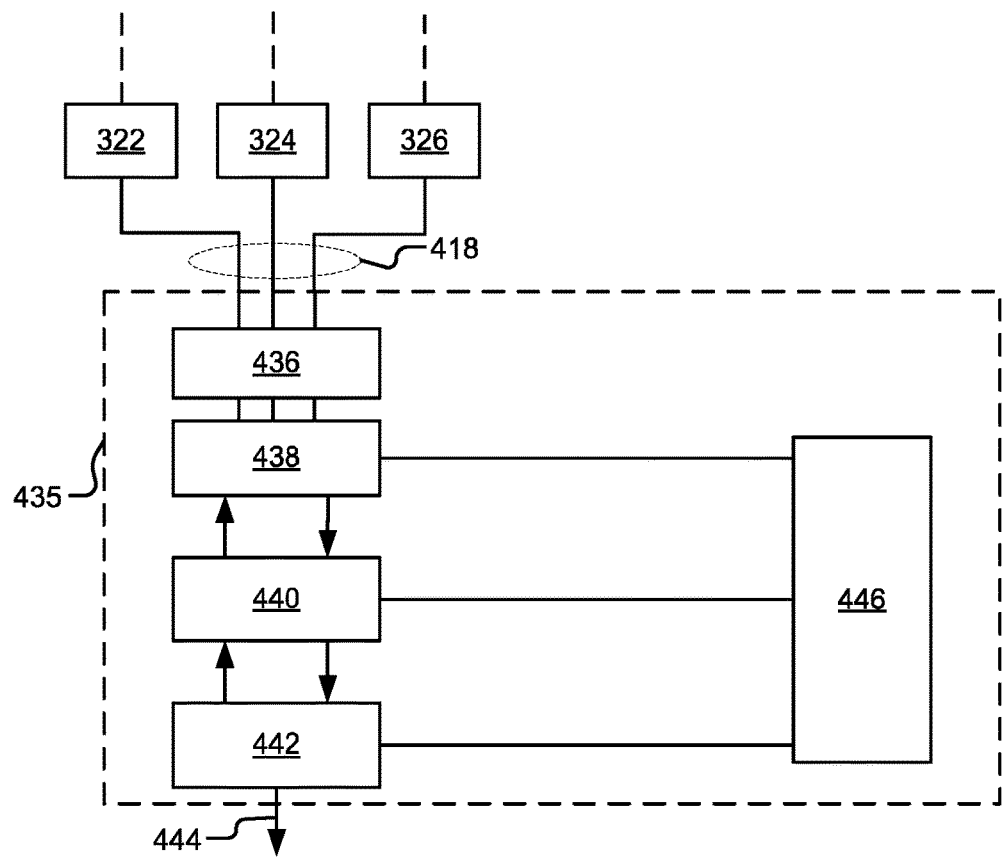
FIG. 6 is a schematic diagram of a strain signal reconstruction apparatus of FIG. 5, in accordance with some embodiments of the present disclosure.

Referring to FIG. 6, a measurement processing unit, for example the strain signal reconstruction module or apparatus 435, is capable of communicating with the first, second and third sampling modules 322, 324, 326 via the I/O ports 418 of the acquisition apparatus 328 for receiving sampled IF current signals, $x_i(n)$, in respect of the first, second and third optical fibres 302, 304, 306. The I/O ports 418 are operably coupled to a phase detector or extractor 436. In this example, the phase detector 436 is configured to detect phases in respect of the sampled IF current signals, $x_i(n)$, but also to differentiate the phases detected. The phases are detected, for example using a Fast Fourier Transform algorithm. The phase detector 436 is operably coupled to a phase processing unit, for example, a phase unwrapper 438. A preconditioning signal generator 440 is coupled to the output of the phase unwrapper 438 and a signal combiner unit 442 having a signal output 444. A control unit 446 is operably coupled to the phase unwrapper 438, the preconditioning signal generator 440, and the signal combiner unit 442.

In general, the technique for detecting phase in the backscatter signal, such as for measuring changes in local strain along the length of the sensing fibre 221 (FIG. 2), can be summarized as follows. The optical output of a highly-coherent optical source, for example the source 202, is divided between two paths, for example the paths 204 and 206. Optionally, the carrier frequency of the signal in one or both of the paths may be frequency shifted to ensure that the carrier frequencies of the optical signals in the two paths differ by a known amount.

Regardless of whether frequency-shifting is employed, the signal in the first path 204 is modulated to form a pulse, which optionally may be amplified. The pulse is then launched into the sensing fibre 221, which generates a backscatter signal in response to the pulse. The backscatter signal returned is separated from the forward-traveling light launched into the sensing fibre 221 and then mixed with the light in the second path 206 onto at least one photodetector to form a mixed output signal, such as an intermediate frequency (IF) signal. In embodiments in which there is no frequency shift, this IF is at zero frequency. After pre-processing the output signal by filtering and amplification, the output signal is converted to the digital domain by sampling the output signal. In this example, the IF source 212 (FIG. 2) generates the driving signal used to shift the relative frequencies of the local oscillator and the backscatter signals by a known amount and which is related to the frequency of the driving signal. The IF source 212 can therefore also be fed to the phase detector 436 to serve as an external reference. Thus, the phase detector 436 provides an output that is proportional (modulo $2\pi/360°$) to the phase-difference between the backscatter signal (mixed down to IF) and the reference from the IF source 212.

Using a Fast Fourier Transform (FFT), and based on a known speed of light in the sensing fibre 221, the phase of the sampled IF output signal at selected locations along the fibre can be extracted and measured. The difference in phase between locations separated by at least one arbitrary distance interval along the sensing fibre 221 can be calculated. As an example, the phase may be measured at locations every meter along the sensing fibre 221 and the phase difference may be determined between locations separated by the arbitrary distance, for example a ten meter interval, such as between all possible pairs of locations separated by ten meters, a subset of all possible pairs of locations separated by ten meters, etc. Finally, at least one more optical pulse is launched into the sensing fibre and the resulting mixed output signal is sampled, the phase information at locations along the fibre is extracted, and the phase differences between locations are determined. A comparison is then performed of the phase differences as a function of distance (obtained based on the known speed of light) along the sensing fibre 221 for at least two such probe pulses. The results of this comparison can provide an indication and a quantitative measurement of changes in strain at known locations along the sensing fibre 221. The above processing is also implemented in respect of sampled output signals associated with the second and third optical fibres 304, 306. However, as will be described later herein, the phases calculated are then unwrapped as part of a method of reconstruction of a strain signal.

Although the foregoing discussion has described the cause of changes in the phase-difference of the backscatter signal as being strain applied to or experienced by the optical fibre 221, other parameters, such as temperature changes, also have the ability to affect the differential phase between sections of the sensing fibre 221. With respect to temperature, the effect of temperature on the sensing fibre 221 is generally slow and can be eliminated from the measurements, if desired, by high-pass filtering the processed signals. Furthermore, the strain on the sensing fibre 221 can result from other external effects than those discussed above. For instance, an isostatic pressure change within the sensing fibre 221 can result in strain on the sensing fibre 221, such as by pressure-to-strain conversion by a coating of the sensing fibre 221.

Regardless of the source of the change in phase differentials, phase detection may be implemented in a variety of manners. In the embodiments set forth herein, the phase detection is performed by digitizing the IF signal and extracting the phase from the digitized signal. However, the phase detection may be carried out using analogue signal processing techniques, if desired.

Figure 7:
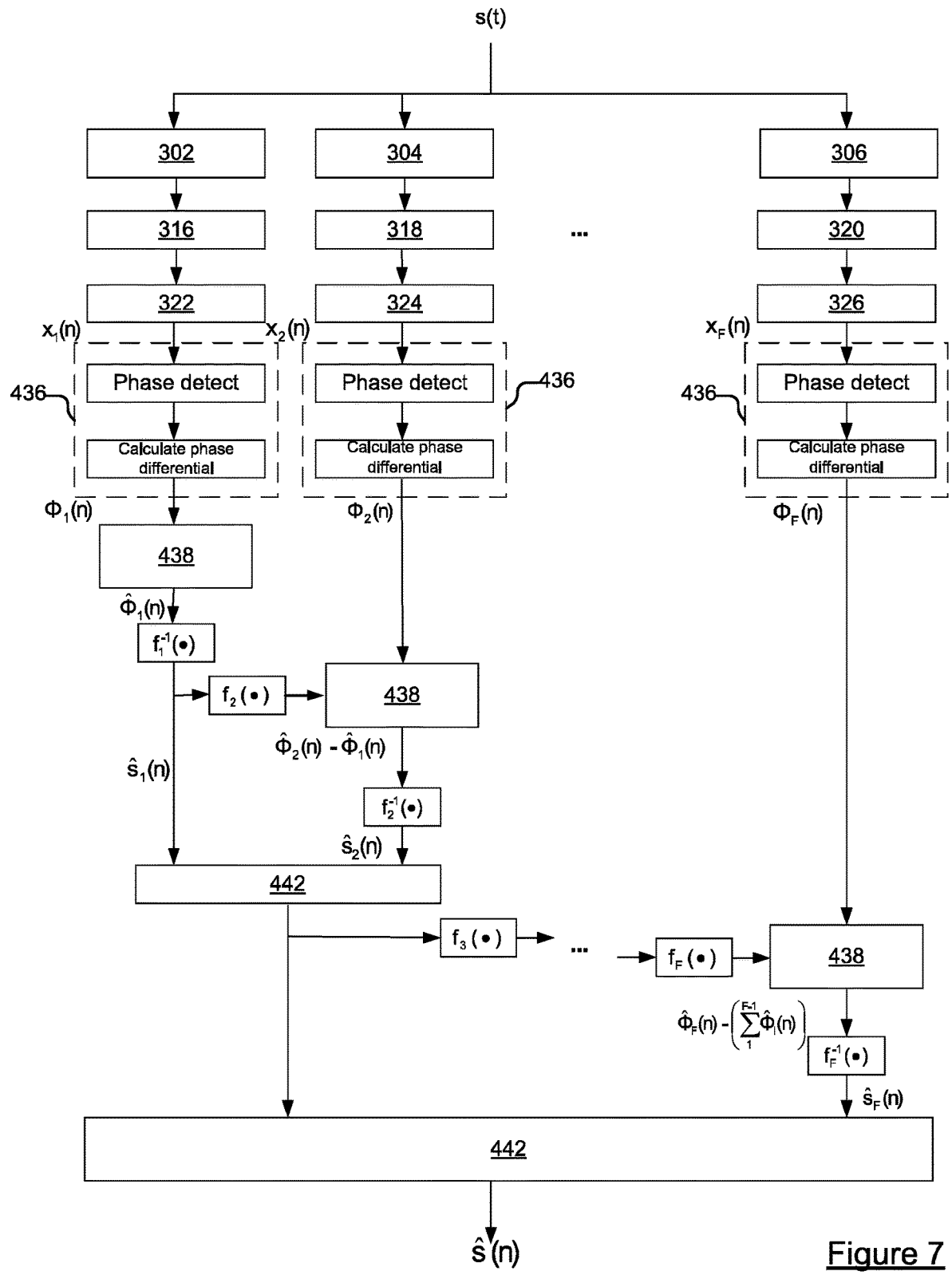
FIG. 7 is an event sequence diagram corresponding to a method of processing strain measurement signals employed by the apparatus of FIG. 3.

In operation (FIGS. 7 and 8), and in overview, an acoustic wave 316 (FIG. 3) is generated, for example by a microseismic event, and propagates towards the cable 300. The acoustic wave 316 is incident upon the cable 300 and each of the first, second and third optical fibres 302, 304, 306 respond to the acoustic wave 316 differently owing to the different sensitivities of the first, second and third optical fibres 302, 304, 306. In this example, the first optical fibre 302 is the least sensitive and the third optical fibre 306 is the most sensitive. The second optical fibre 304 has a sensitivity that is between the sensitivities of the first and third optical fibres 302, 306. As such, the less sensitive the optical fibre, the larger the change in the acoustic signal that can be detected without saturation, but smaller acoustic signals lie below a noise floor of the measuring OTDR system 200 using the less sensitive optical fibres, for example the first optical fibre 302, and so cannot be recovered from the backscattered light generated by the less sensitive optical fibres.

In contrast, the more sensitive the optical fibre, the more prone the optical fibre is to generating an output signal that is saturated by backscattered light attributable to the changes in large acoustic signals. In the phase domain, and for more sensitive optical fibres, this results in optical signals generated by large strain variations induced by large changes in acoustic signals having phases that are wrapped multiple times, the number of times being indeterminable using a conventional phase unwrapping algorithm, and so the phase cannot be properly unwrapped and the resultant unwrapped phase signal is aliased with incorrectly unwrapped phase information.

Nevertheless, in the embodiments described herein, the respective backscattered optical signals generated by the first, second and third optical fibres 302, 304, 306, respectively, in response to the acoustic wave 316 can be analysed in accordance with a method of processing a strain measurement signal described herein in order to extract useful signals representing strain sensed. In this respect, the first, second and third coherent detectors 316, 318, 320 generate output signals that, following sampling by the respective first, second and third sampling modules 322, 324, 326, can be further processed in order to reconstruct an estimate of a strain signal corresponding to a strain effectively applied to each of the first, second and third optical fibres 302, 304, 306 irrespective of their respective sensitivities.

In one embodiment, preceding phase signal estimate(s) in respect of an optical fibre is/are used to precondition a phase signal estimate in respect of a strain experienced by a succeeding, more sensitive, optical fibre. In the context of the first, second and third optical fibres 302, 304, 306, a first estimated phase signal in respect of the first optical fibre 302 is used to precondition a second estimated phase signal in respect of the second optical fibre 304. Likewise, the first and second phase estimates generated in respect of the first and second optical fibre 302, 304 are used to precondition a third estimated phase signal in respect of the third optical fibre 306.

As a result of the acoustic wave 316 being incident upon the first, second and third optical fibres 302, 304, 306, a time-varying applied strain, s(t), is applied (Step 450) to each of the first, second and third optical fibres 302, 304, 306 in respect of a given longitudinal position along each of the first, second and third optical fibres 302, 304, 306. As described above, respective pulsed signals are used to interrogate (Step 452) the first, second and third optical fibres 302, 304, 306, resulting in the first, second and third coherent detectors 316, 318, 320 respectively generating (Step 454) a first time-varying IF current output signal, $x_1(t)$, responsive to the applied strain signal, s(t), a second time-varying IF current output signal, $x_2(t)$, responsive to the applied strain signal, s(t), and a third time-varying IF current output signal, $x_3(t)$, responsive to the applied strain signal, s(t). The time-varying IF current signals, $x_i(t)$, are then sampled (Step 456) by the first, second and third sampling modules 322, 324, 326. In this example, first, second and third sampled signals, $x_1(n)$, $x_2(n)$, $x_3(n)$, are provided by the first, second and third sampling modules 321, 324, 326 and constitute measured signals having respective gains associated therewith corresponding to the transfer functions of the optical fibres. As will be appreciated by the skilled person, representation of the first, second and third sampled signals, $x_1(n)$, $x_2(n)$, $x_3(n)$, in their actual form will result in an overly complicated description of the embodiments herein. Consequently, for the sake of conciseness and clarity of explanation, the sampled IF output signal, $x_i(n)$ can be represented notionally, using complex notation, as:

$$x_i(n) = e^{-j\phi_i(n)} \quad (1)$$

Where the index, i, refers to the corresponding $i^{th}$ optical fibre and $\phi_i(n)$ is, in this example, an $i^{th}$ differential phase of the $i^{th}$ IF current signal between two predetermined locations along the $i^{th}$ optical fibre. However, it should be appreciated that in common with the exemplary waveform used above, the actual sampled signal possesses a phase, which would be detected by the phase detector 436.

Since the applied strain in respect of the optical fibres 302, 304, 306 is a function of time, which in the digital domain can be expressed as s(n), it therefore follows that the phase of the IF current signal sampled in respect of each of the first, second and third coherent detectors 316, 318, 320 corresponding to the first, second and third optical fibres 302, 304, 306 is dictated by the transfer function of each of the first, second and third optical fibres 302, 304, 306 as a function of the applied strain signal, s(n). Indeed, the phase response, $\phi_i(n)$, of the $i^{th}$ optical fibre can be expressed using the transfer function of the $i^{th}$ optical fibre and the time-varying applied strain signal, s(n):

$$\phi_i(n) = f_i(s(n)) \quad (2)$$

Where the $i^{th}$ strain signal is an estimate, $\hat{s}_i(n)$, the estimated phase can be expressed as:

$$\hat{\phi}_i(n) = f_i(\hat{s}_i(n)) \quad (3)$$

In this example, only the gain/sensitivity differ between optical fibres and so the transfer function of each optical fibre, $f_i(\bullet)$, can be treated as a scalar for each optical fibre, i.e. $f_i(\bullet) = g_i$. Nevertheless, the skilled person will appreciate that the transfer function can be a more complicated function than a simple scalar multiplier. However, in view of the present simplification, the phase in the exponent of equation (2) can be rewritten as:

$$\phi(n) = g_i \cdot s(n) \quad (4)$$

As mentioned above in relation to the first optical fibre 302, the first coherent detector 316 generates (Step 454) the first IF current signal which is received by the first sampling module 322. The first sampling module 322 samples (Step 456), the first IF current signal to yield the first sampled IF signal, $x_1(n)$. The first sampling module 322 provides the first sampled IF signal, $x_1(n)$, to the phase detector 436 that detects (Step 458), sometimes referred to as "extracts", phase information in the first sampled IF signal, $x_1(n)$, in the form of a first detected phase signal, $\phi_1(n)$, which is wrapped. The phase detector 436 also performs the same functionality in respect of the second sampled IF signal, $x_1(n)$, and the third sampled IF signal $x_2(n)$ (Step 458). As mentioned above, the phases extracted by the phase detector 436 are in modulo $2\pi/360°$ form and so require unwrapping. In this respect, the control unit 446 instructs (Step 460) the phase unwrapper 438 to apply a phase unwrapping algorithm to the first detected phase signal, $\phi_1(n)$, in order to yield an estimated first unwrapped phase signal, $\hat{\phi}_1(n)$, which is an estimate of an unwrapped version of the first wrapped phase signal, $\phi_1(n)$, taking noise into account.

Given the relationship between phase and strain expressed in equations (2) and (3) above, the strain detected by the first optical fibre 302 can be estimated, $\hat{s}_1(n)$, by applying the inverse of the first transfer function, $f_1^{-1}(\ )$, to the first estimated phase signal, $\hat{\phi}_1(n)$. Indeed, more generally, as the transfer function of each optical fibre is known, for example as expressed in equation (4) above, the inverse of the transfer function, $f_i^{-1}(\hat{\phi}_i(n))$ can be used to obtain an estimate of the strain measurement signal, $\hat{s}_i(n)$, sensed by the $i^{th}$ optical fibre.

In relation to the first optical fibre 302, the inverse of the first transfer function, $f_1^{-1}(\hat{\phi}_1(n))$ is employed by the preconditioning signal generator 440 in order to obtain an estimate (Step 462) of the first strain signal, $\hat{s}_1(n)$. The estimate of the first strain signal, $\hat{s}_1(n)$, is communicated to the signal combiner 442, the function of which will be described later herein in greater detail.

The estimate of the first strain signal, $\hat{s}_1(n)$, once determined, can also be used to precondition the phase unwrapping process performed by the phase unwrapper 438 in order to determine an estimate of the second strain signal, $\hat{s}_2(n)$, in respect of the second optical fibre 304.

Having calculated a first estimate of the strain signal, $\hat{s}_1(n)$, in respect of the first optical fibre 302, the control unit 446 advances (Step 464) a record of a current fibre in respect of which a strain signal is being estimated. In this example, the control unit 446 increases a counter, i, which was initially set to 1, by unity so that the counter, i, is now equal to 2. The strain signal is therefore now being estimated in respect of the second optical fibre 304. As mentioned above, the second sampling module 324 generates (Step 456) the second sampled IF signal, $x_2(n)$ and the phase detector 436 detects (Step 458) the phase in respect of the second sampled IF signal, $x_2(n)$, and calculates the second differential phase, $\phi_2(n)$. However, in order to be able to unwrap the second phase signal, $\phi_2(n)$, the control unit 446 coordinates preconditioning of the second phase signal, $\phi_2(n)$, prior to unwrapping.

In this example, the preconditioning is implemented by using the preconditioning signal generator 440 firstly to apply (Step 466) the second transfer function, $f_2(\bullet)$, to any previously summarised estimated strain signals. In this example, so far, processing has only taken place in respect of the first optical fibre 302 and so only the first estimated strain signal, $\hat{s}_1(n)$, is available to serve as the sum of any previous estimated strain signals. Consequently, the second transfer function, $f_2(\bullet)$, is applied (Step 466) by the preconditioning signal generator 440 to the estimated first strain signal, $\hat{s}_1(n)$, in order to obtain the estimated phase signal, $f_2(\hat{s}_1(n))$, in respect of the sensitivity of the second optical fibre 304. This can then be used to precondition the detected second phase signal, $\phi_2(n)$, prior to unwrapping for the following reasons.

In order to remove the influence of fast signal variations, the detected strain signals of preceding optical fibre of lesser sensitivity can be used, because the estimated strain signals associated with the preceding optical fibres are only capable of sensing fast signal variations and not more subtle, slower, signal variations. Fast and slow are, of course, relative terms, but the points of reference are the current optical fibre and those preceding it, which have respective lower sensitivities. However, the influences of fast signal variations are represented in the estimated strain signals associated with lesser sensitive optical fibres without representing slower signal variations. As such, this information can be used to isolate the phase components associated with slower signal variations that cannot be sensed by the preceding optical fibres but can be sensed by the current optical fibre.

As mentioned above, sampled IF signals can be expressed in the form of equation (1), i.e. as exponentials. Given that the product of exponentials can be simplified as a single exponential having an exponent that is the sum of the exponents of the individual exponential terms of the product:

$$e^{j(a+b)} = e^{ja}e^{jb}$$

this can be used to express a current sampled IF signal, $x_i(n)$, comprising signal components in common with sampled IF signals in respect of preceding optical fibres and signal components of interest (because the strain signal(s) has/have already been estimated in respect of less sensitive fibres). This can be expressed as:

$$e^{-j\phi_1(n)} e^{-j\phi_2(n)} \ldots e^{-j\phi_i(n)}$$

This can be simplified to:

$$e^{-j(\phi_1(n)+\phi_2(n)+ \ldots +\phi_i(n))}$$

It therefore follows that removal of unwanted phase terms can be achieved by modifying the sign of the exponent of the unwanted terms, i.e.

$$e^{j(\phi_1(n)+ \ldots +\phi_{i-1}(n))}$$

Hence, by applying this signal to a current sampled IF signal, $x_i(n)$, yields a preconditioned sampled IF signal, which when unwrapped and processed in relation the inverse of the transfer function, $f_i(\bullet)$, of the current optical fibre, i, allows an estimate of the strain signal, $\hat{s}_i(n)$, to be generated only in respect of the rate of signal variations to which the current optical fibre, i, is sensitive. In this respect, a preconditioned sampled IF signal, $\tilde{x}_i(n)$, can be expressed as:

$$\tilde{x}_i(n) = x_i(n)e^{j(\phi_1(n)+ \ldots +\phi_{i-1}(n))} \quad (5)$$

As has been explained above, the phase unwrapper 438 generates an estimate of phase signals, $\hat{\phi}_i(n)$, which are translated into estimates of strain signals, $\hat{s}_i(n)$, by the preconditioning signal generator 440 using the inverse transfer function of each optical fibre. Hence, equation (5) can be expressed as:

$$\tilde{x}_i(n) = x_i(n)e^{jf_i(f_{i-1}^{-1}(\hat{\phi}_{i-1}(n))+f_{i-2}^{-1}(\hat{\phi}_{i-2}(n))+\ldots+f_1^{-1}(\hat{\phi}_1(n)))}$$

$$= x_i(n)e^{jf_i(\hat{s}_{i-1}(n)+\hat{s}_{i-2}(n)+\ldots+\hat{s}_1(n))}$$

This can be expressed with a summation series as:

$$\tilde{x}_i(n) = x_i(n)e^{jf_i(\sum_{k=1}^{i-1}\hat{s}_k(n))} \quad (6)$$

Expressed in words, the phase term of the preconditioning term of equation (6) above is the transfer function of the current optical fibre, i, applied to the sum of the estimates of the strain signals in respect of the preceding optical fibres (i=1, . . . , F-1). In this respect, due to the property of multiplied exponentials explained above, in the phase domain, equation (6) above constitutes the subtraction of the phase signals calculated in respect of the preceding optical fibres (i=1, . . . , F-1) from the phase detected in respect of the current optical fibre, i, (because $x_i(n)=e^{-j\phi_i(n)}$).

Furthermore, in relation to the application of transfer functions, in this example, $f_i(\bullet)$ is a scalar $g_i$, and so application of the transfer functions in equation (6) above can be expressed in terms of scalars as follows:

$$\tilde{x}_i(n) = x_i(n)e^{j\left(\sum_{k=1}^{i-1}\frac{g_i}{g_k}\phi_k(n)\right)}$$

Hence, in the context of the first and second optical fibres, 302, 304, the preconditioned second sampled IF signal, $\tilde{x}_2(n)$, is given by:

$$\tilde{x}_2(n) = x_2(n)e^{j\frac{g_2}{g_1}\phi_1(n)}$$

where $x_2(n)$ is the sampled second IF signal received by the phase detector 436.

Figure 8:
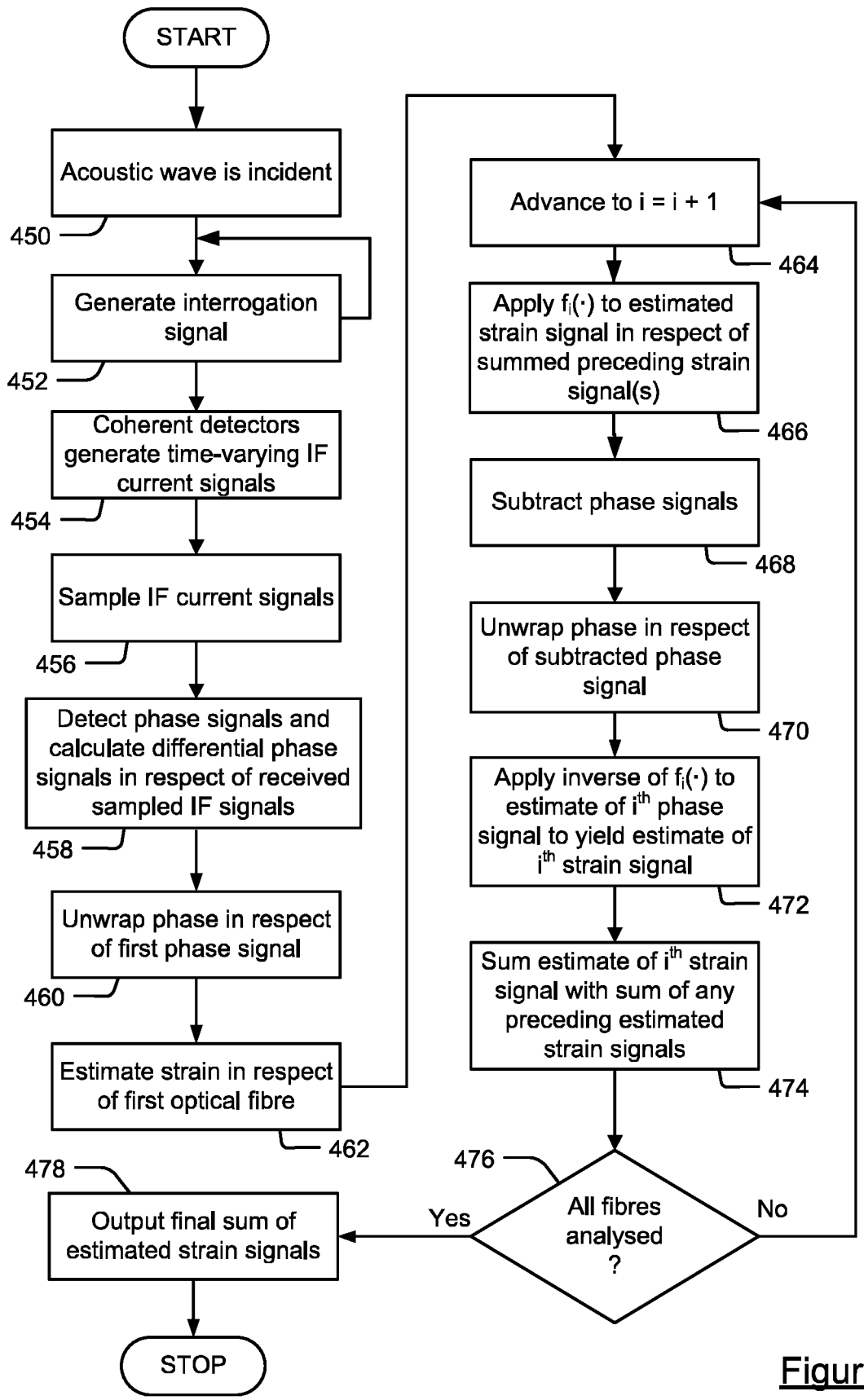
FIG. 8 is a flow diagram of the method of processing strain measurement signals employed by the apparatus of FIG. 3, in accordance with some embodiments of the present disclosure.

Returning to the example of FIG. 8, having instructed the preconditioning signal generator 440 to apply the second transfer function, $f_2(\bullet)$, to the first estimate of the strain signal, $\hat{s}_1(n)$, the control unit 446 instructs the preconditioning signal generator 440 to obtain from the phase unwrapper 438 the phase detected by the phase detector 436 in respect of the second optical fibre 304 and to subtract (Step 468) the phase, calculated by application of the second transfer function to the first estimate of the strain signal, $\hat{s}_1(n)$, from the phase signal generated by the phase detector 436 in respect of the second optical fibre 304. The preconditioning phase generator 440 is then instructed to communicate the subtracted phase signal to the phase unwrapper 438. The phase unwrapper 436 is then instructed by the control unit 446 to unwrap (Step 470) the subtracted phase signal, constituting a preconditioned phase signal. The estimated phase, $(\hat{\phi}_2-\hat{\phi}_1)$, is then communicated back to the preconditioning signal generator 440, where the inverse of the second transfer function, $f_2(\bullet)$, associated with the second optical fibre 304, is applied (Step 472) to the unwrapped preconditioned phase signal, $(\hat{\phi}_2-\hat{\phi}_1)$. The application of the inverse of the second transfer function, $f_2^{-1}(\bullet)$, to the estimate of the unwrapped preconditioned phase signal, $(\hat{\phi}_2-\hat{\phi}_1)$, yields an estimate of the strain signal, $\hat{s}_2(n)$, in respect of the second optical fibre 304, but in particular in relation to the rate of signal variations to which the second optical fibre 304 is sensitive but not any of the preceding optical fibres. Subsequently, the control unit 446 instructs the preconditioning signal generator 440 to communicate (Step 474) the second estimate of the strain signal, $\hat{s}_2(n)$ to the signal combiner 442 for summation with any previously summed estimates of the strain signal. In this example, the second estimate of the strain signal, $\hat{s}_2(n)$, is therefore summed with the first estimate of the strain signal, $\hat{s}_1(n)$, stored by the signal combiner 442.

The control unit 446 then determines (Step 476) whether signals from subsequent optical fibres need to be processed in respect of the current acoustic signal 316. In this current example, the third optical fibre 306 has the third sampled IF signal, $x_3(n)$, associated therewith that requires processing and so the control unit 446 advances (Step 464) the counter, i, to correspond to processing of the third sampled IF signal, $x_3(n)$. In this regard, the third sampling unit 326 generates the third sampled IF signal, $x_3(n)$. As described above in relation to the second optical fibre 304, the signal combiner 442 has generated a sum of the first estimate of the strain signal $\hat{s}_1(n)$, and the second estimate of the strain signal, $\hat{s}_2(n)$. The preconditioning signal generator 440 applies (Step 466) the third transfer function, $f_3(\bullet)$, in respect of the third optical fibre 306 to the sum of the preceding estimated sample signals, i.e. the estimated first strain signal, $\hat{s}_1(n)$, and the second estimate of the strain signal, $\hat{s}_2(n)$, at this stage of this example, in order to yield the preconditioning phase component signal, $f_3(\hat{s}_1(n)+\hat{s}_2(n))$, in respect of the response of the third optical fibre 306. In order to precondition the third phase signal, $\phi_3(n)$, generated by the phase detector 436, the phase unwrapper 438 communicates the extracted third phase signal, $\phi_3(n)$, to the preconditioning signal generator 440, which subtracts (Step 468) the preconditioning phase component signal, $(\hat{\phi}_1(n)+\hat{\phi}_2(n))$, from the third phase signal $\phi_3(n)$ in order to yield a preconditioned phase signal that is communicated back to the phase unwrapper 438 by the preconditioning signal generator 440. The phase unwrapper 438 then unwraps (Step 470) the preconditioned phase signal to yield a third estimate of phase, $(\hat{\phi}_3-\hat{\phi}_2-\hat{\phi}_1)$, which is then communicated back to the preconditioning signal generator 440 where the inverse of the third transfer function, $f_3^{-1}(\ )$, associated with the third optical fibre 306, is applied (Step 472) to the unwrapped preconditioned phase signal, $\hat{\phi}_3(n)-(\hat{\phi}_2(n)+\hat{\phi}_1(n))$, to yield a third estimate of the strain signal, $\hat{s}_3(n)$, in respect of the third optical fibre 306, but in particular in relation to the rate of signal variation to which the third optical fibre 306 is sensitive but not any of the preceding optical fibres.

The control unit 446 then instructs (Step 474) the preconditioning signal generator 440 to communicate the third estimate of the strain signal, $\hat{s}_3(n)$, to the signal combiner 442 for summation with any previously summed estimates of the strain signal. In this example, the third estimate of the strain signal, $\hat{s}_3(n)$, is summed with the sum of the first and second estimates of the strain signal, $(\hat{s}_1(n)+\hat{s}_2(n))$, already stored by the signal combiner 442. Thereafter, the control unit 446 determines (Step 476) whether sampled IF signals in respect of all optical fibres have been analysed in respect of the current acoustic signal 316. In this example, analysis of all the sampled IF signals is determined to be complete and so the control unit 446 instructs the signal combiner 442 to output (Step 478) the current sum of estimated strain signals, $(\hat{s}_1(n)+\hat{s}_2(n)+\hat{s}_3(n))$, as a reconstruction of an estimate of the strain signal, $\hat{s}(n)$. The reconstructed strain signal, $\hat{s}(n)$, can be saved and used subsequently for seismic imaging, for example for microseismic monitoring or vertical seismic profiling applications.

It should be appreciated that the first, second and third estimates of the strain signal, $\hat{s}_1(n)$, $\hat{s}_2(n)$, $\hat{s}_3(n)$, respectively relate to backscattered light generated by the first, second and third optical fibres 302, 304, 306 associated with their respective sensitivities to strain applied to them. The above process is repeated in respect of subsequent acoustic signals incident upon, and hence strain experienced by, the fibre optic sensor 102. If desirable, an additional processing step performed by the signal combiner 442 can be to apply a filter to each of the strain estimates, $\hat{s}_1(n)$, $\hat{s}_2(n)$, $\hat{s}_3(n)$, to remove signal components that are below the dynamic range of each respective optical fibre. For example, the first estimate of the strain signal, $\bar{s}_1(n)$, may have small signal components that are outside the dynamic range of the first optical fibre, attributable to laser or thermal noise. These signal components might be similar in amplitude to the second and third estimates of the strain signal, $\hat{s}_2(n)$ and $\hat{s}_3(n)$, and so should therefore be removed. A possible filter implementation can be to remove all frequency components with an amplitude below a predetermined amplitude threshold related to the system dynamic range.

Figure 9:
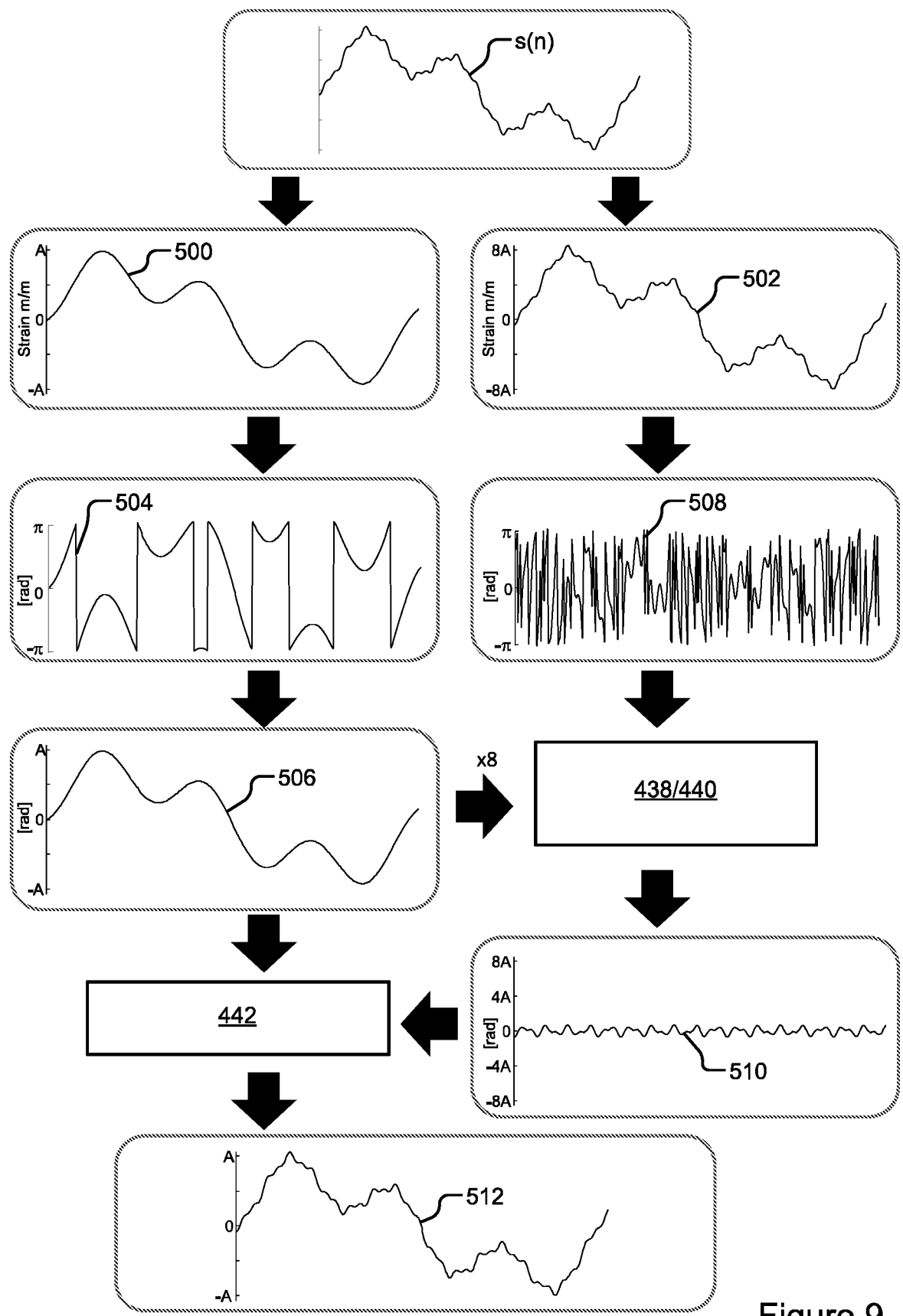
FIG. 9 is a hybrid schematic diagram of processing of waveforms generated using the method of FIG. 8.

In order to understand operation of the strain signal reconstruction apparatus 435 further, reference will now be made to FIG. 9 in relation to the first and second optical fibres 302, 304.

The acoustic signal 316 exerts a strain, s(t), upon the fibre optic sensor 102. In this example, the second optical fibre 304 is eight times more sensitive than the first optical fibre 302. Both the first and second optical fibres 302, 304 are exposed to the acoustic signal 316. However, due to the different sensitivities, the first optical fibre 302 is less sensitive to slower strain variations and so the first sampled IF signal 500 ($x_1(n)$) generated by the first sampling module 332 in respect of the first optical fibre 302 does not comprise small current variations corresponding to slower signal variations of the strain signal, s(t), but instead only comprises larger current variations corresponding to faster signal variations of the strain signal, s(t), as a result of this lower sensitivity.

The second optical fibre 304 is more sensitive than the first optical fibre 302 and so the second sampled IF signal 502 ($x_2(n)$), generated by the second sampling module 324 in respect of the second optical fibre 304 is of sufficiently high sensitivity to comprise small current variations corresponding to slow signal variations of the strain signal, s(t). In this respect, a given phase signal derived from a sampled IF signal can be considered as a consolidation of one or more (if present) preceding phase signals(s) and an additional phase signal, which is unrecoverable from the preceding sampled IF signal(s) due to insensitivity of the preceding respective optical fibres to aspects of the acoustic wave 316 associated with the additional phase signal.

The phase detector 436 next detects the phase of the first and second sampled IF signals 500, 502 which result in the first wrapped phase signal 504, $\phi_1(n)$ and the second wrapped phase signal 508, $\phi_2(n)$, wrapped in the phase domain. The first wrapped phase signal 504, $\phi_1(n)$, is subsequently unwrapped by the phase unwrapper 438 using a phase unwrapping algorithm, constituting a predetermined processing technique, to yield the estimated first unwrapped phase signal 506, $\hat{\phi}_1(n)$. The inverse of the first transfer function, $f_1^{-1}()$, is then applied to the first unwrapped phase estimate signal 506, $\hat{\phi}_1(n)$, in order to obtain a first estimate of the strain signal, $\hat{s}_1(n)$, in respect of the first optical fibre 302. The first estimate of the strain signal, $\hat{s}_1(n)$, is then used by the signal combiner 442 in order to reconstruct an estimate of the strain signal, $\hat{s}(n)$, by generating a composite signal, as will be described later herein.

The first estimate of the strain signal $\hat{s}_1(n)$, in respect of the first optical fibre 302 is absent of smaller strain variations and so in order to reconstruct the strain signal, $\hat{s}(n)$, in a more complete manner it is necessary to obtain a phase signal in respect of the slower strain variations sensed by the second optical fibre 304, because the second optical fibre 304 is more sensitive than the first optical fibre 302. In this regard, the second phase signal 508, $\phi_2(n)$, comprises the first phase signal, $\phi_1(n)$, and the additional phase signal mentioned above that is associated with the sensitivity of the second optical fibre 304, the two being indistinguishable from one another in the phase domain. Consequently, if the phase detector 436 were simply to extract the phase from the second sampled IF signal 502, $x_2(n)$, without any preconditioning being performed by the preconditioning signal generator 440, owing to the increased sensitivity of the second optical fibre 304 and the rate of change of parts of the strain signal measured, the wrapped unpreconditioned second phase signal, $\phi_2(n)$, would be aliased and so the phase unwrapper 438 would subsequently be unable to unwrap the unpreconditioned second phase signal 508, $\phi_2(n)$.

However, the predetermined processing technique mentioned above employs a priori knowledge of the large signal variations of the strain signal, s(t), that cause saturation of the second unwrapped phase signal, $\phi_2(n)$, in order to enable the phase unwrapper 438 to process, including unwrap, the second phase signal 508, $\phi_2(n)$, substantially free of the effects of the faster strain variations. This unwrapped phase signal of interest is obtained as follows.

As described above, the unwrapped first estimated phase signal 508, $\hat{\phi}_1(n)$, has been obtained and converted to the first estimate of the strain signal, $\hat{s}_1(n)$. This signal represents the fast strain variations free of the small strain variations, because the first optical fibre 302 is insensitive to the slow strain variations. The first estimate of the strain measurement signal, $\hat{s}_1(n)$, can therefore be used as the a priori knowledge to reconstruct an a priori estimate of the phase signal associated with the faster strain signal variations aliased with the second phase signal 508, $\phi_2(n)$, and to detect the superimposed smaller signals associated with slower strain variations. To achieve this, the second transfer function, $f_2(\bullet)$, is applied to the first estimate of the strain signal, $\hat{s}_1(n)$, in order to translate the first estimate of the strain signal, $\hat{s}_1(n)$, back into the phase domain as the unwrapped first estimated phase signal 506, $\hat{\phi}_1(n)$, albeit as a result of applying the response of the second optical fibre 304. The unwrapped first estimated phase signal 506, $\hat{\phi}_1(n)$, is then used by the preconditioning signal generator 440 in accordance with equation (6) in order to generate the preconditioned phase signal ($\phi_2(n)-\hat{\phi}_1(n)$) that is provided to the phase unwrapper 438 to be unwrapped. The inverse of the second transfer function, $f_2^{-1}(\bullet)$, is then applied to the estimated second phase signal 510, which is the unwrapped preconditioned phase signal ($\phi_2(n)-\hat{\phi}_1(n)$) in order to obtain a second estimate of the second strain signal, $\hat{s}_2(n)$, in respect of the second optical fibre 304 for the signal variations to which the second optical fibre 304 is sensitive.

The second estimate of the strain signal, $\hat{s}_2(n)$, can then be used by the signal combiner 442 in combination with the first estimate of the strain signal, $\hat{s}_1(n)$, in order to generate a composite signal. In this respect, the first and second estimates of the strain signal, $\hat{s}_1(n)$, $\hat{s}_2(n)$, are signals of different amplitude, which are combined by the signal combiner 442 to yield the reconstructed strain signal 512, $\hat{s}(n)$, as well as an accumulation of the estimates of the strain signal $\hat{s}(n)$, for generation of preconditioned phase signals in respect of subsequent sampled IF signals corresponding respectively to subsequent optical fibres. In the above example, the third optical fibre is the subsequent optical fibre. The reconstructed strain signal 512, $\hat{s}(n)$, comprises both the large signal variations sensed by the first optical fibre 302, and the smaller signal variations sensed by the second optical fibre 304.

Figure 10:
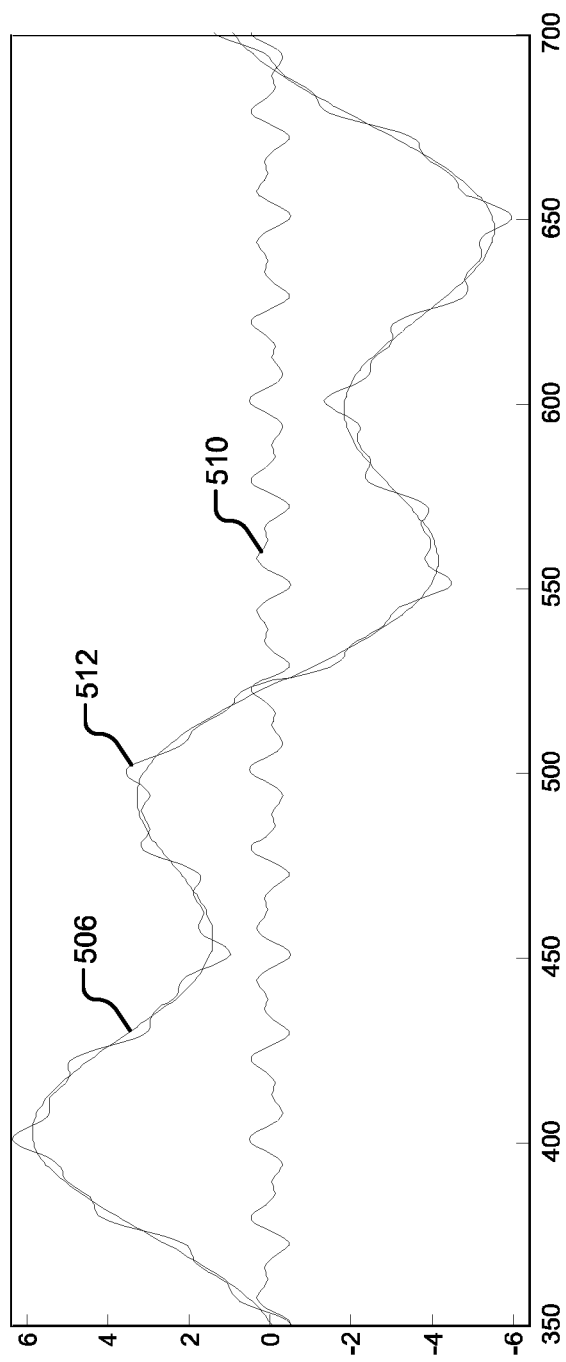
FIG. 10 is a graph of waveforms at different stages of processing as generated by following the method of FIG. 8.

Referring to FIG. 10, the signal combiner 442, using the principle of superposition, combines the first estimate of the strain signal 506, $\hat{s}_1(n)$, representing the fast signal variations with the second estimate of the strain measurement signal 510, $\hat{s}_2(n)$, representing the slow signal variations in order to yield the reconstructed strain signal 512, $\hat{s}(n)$.

Figure 11:
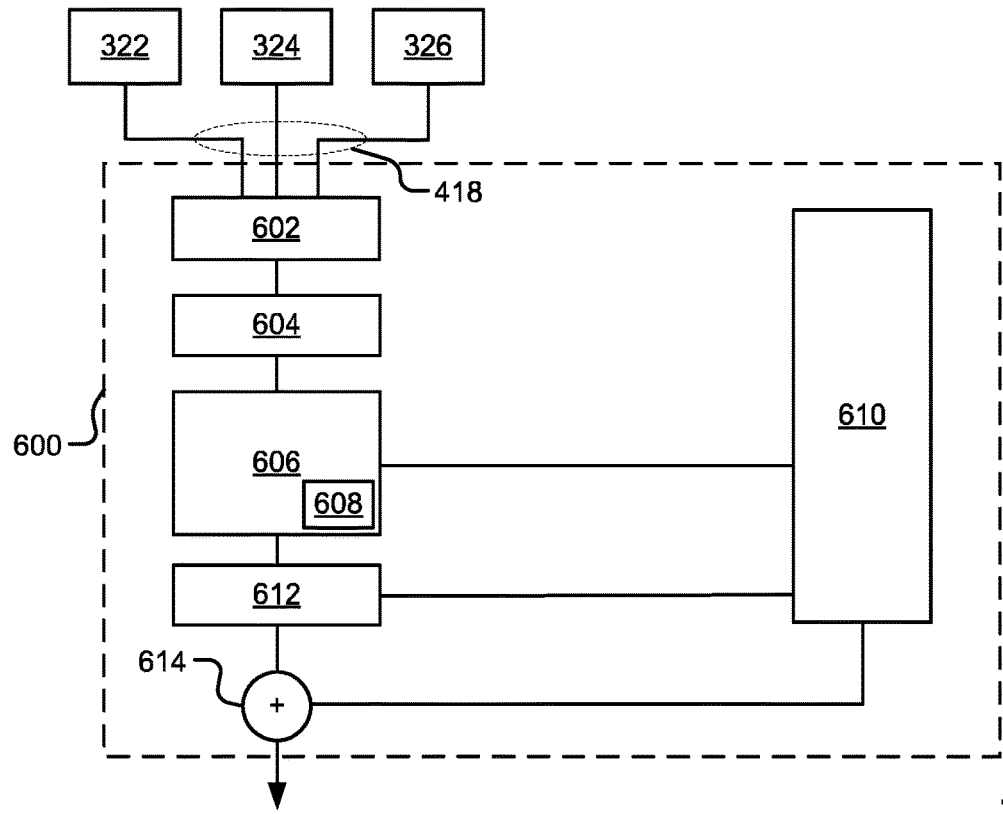
FIG. 11 is a schematic diagram of a strain signal reconstruction apparatus, in accordance with some embodiments of the present disclosure.

In another embodiment, the reconstructed strain signal 512, ŝ(n), is generated using a signal segmentation approach. Turning to FIG. 11, an alternative version of the strain signal reconstruction apparatus 435 is employed. In this example, there is no initial need for extraction or unwrapping; these processing steps are performed once an unsaturated IF current signal, x(n), over a time period of interest has been generated.

In support of this approach, an alternative strain signal reconstruction apparatus 600 comprises a phase detector 602 having inputs for receiving first, second and third sampled IF signals, $x_1(n)$, $x_2(n)$, $x_3(n)$, from each of the first, second and third sampling modules 322, 324, 326, respectively. In this example, the preconditioning signal generator 440 of FIG. 6 is not employed. An output of the phase detector 602 is operably coupled to an input of a phase unwrapper 604, which together constitute a phase signal generator. An output of the phase unwrapper 604 is operably coupled to an input of a signal analyser 606 comprising a data store 608 for permanently or temporarily storing received signals and/or processing-related parameters. The signal analyser 606 is operably coupled to a control unit 610 and a strain signal estimator 612, which is also coupled to the control unit 610. An output of the strain signal estimator 612 is operably coupled to a signal combiner 614, the signal combiner 614 having an output and also being operably coupled to the control unit 610.

Figure 12:
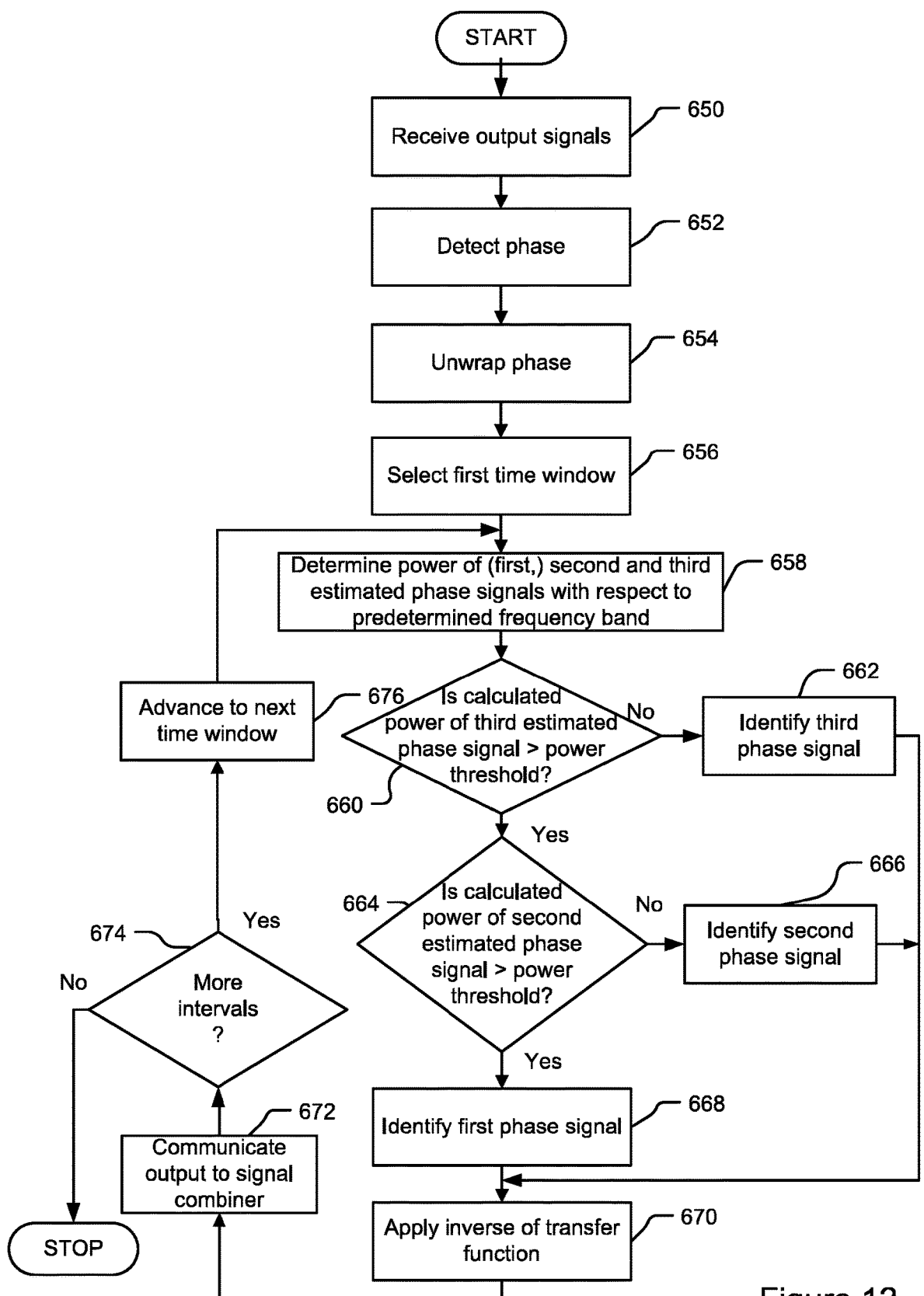
FIG. 12 is a flow diagram of another method of processing a strain measurement signals employed by the processor of FIG. 11, in accordance with some embodiments of the present disclosure.

In operation (FIG. 12), each of the first, second and third sampling modules 322, 324, 326 respectively generate a first IF sampled signal, $x_1(n)$, a second IF sampled signal, $x_2(n)$, and a third IF sampled signal, $x_3(n)$, constituting first, second and third signals, which are received (Step 650) by the phase detector 602 following the acoustic signal 316 being incident upon the first, second and third optical fibres 302, 304, 306. The phase detector 602 then detects (Step 652) the phase of each of the first, second and third sampled IF signals, $x_1(n)$, $x_2(n)$, $x_3(n)$, to yield respective first, second and third wrapped phase signals, $\phi_1(n)$, $\phi_2(n)$, $\phi_3(n)$. The first, second and third wrapped phase signals, $\phi_1(n)$, $\phi_2(n)$, $\phi_3(n)$, are then communicated to the phase unwrapper 604, which subjects each of the first, second and third wrapped phase signals, $\phi_1(n)$, $\phi_2(n)$, $\phi_3(n)$, to an unwrapping algorithm in order to unwrap (Step 654) and yield respective estimates of the first, second and third unwrapped phase signal, $\hat{\phi}_1(n)$, $\hat{\phi}_2(n)$, $\hat{\phi}_3(n)$. The first, second and third estimated phase signals, $\hat{\phi}_1(n)$, $\hat{\phi}_2(n)$, $\hat{\phi}_3(n)$, are then received by the signal analyser 606.

The signal analyser 606 comprises stored data concerning a power threshold value in respect of a predetermined frequency band, which is used as a reference for comparison purposes to determine whether a given phase signal is saturated, saturation constituting a predetermined selection criterion that is employed as described later herein. In this example, the predetermined frequency band can be between about 500 Hz and about 1000 Hz. However, the skilled person should appreciate that an upper limit does not have to be applied and so the term "frequency band" can embrace frequencies above and/or equal to and above a predetermined threshold frequency value, for example by high-pass filtering. By employing signal power thresholding in respect of the predetermined frequency band, for example, the signal analyser 606 can identify which of the first, second or third optical fibres 302, 304, 306 is not experiencing, or is experiencing least, signal saturation by the acoustic wave 316 incident upon each of the first, second and third optical fibres 302, 304, 306. The frequency component selection can be achieved by filtering the unwrapped phase signals.

In order to select an optimum phase signal from those available in respect of the first, second and third optical fibres 302, 304, 306, a first time interval is firstly selected (Step 656) by the signal analyser 606 in accordance with a predetermined time interval size, and the power of each of the second and third, and (optionally) the first, estimated phase signals, $\hat{\phi}_2(n)$, $\hat{\phi}_3(n)$, $\hat{\phi}_1(n)$, is calculated (Step 658) in respect of the selected time window and confined to frequency components of the phase signals within the predetermined frequency band, for example the power of signal frequency components within the predetermined frequency band. The signal analyser 606 then compares (Step 660) the power of the third estimated phase signal, $\hat{\phi}_3(n)$, (in the manner calculated above) with the power threshold value stored in the data store 608 in order to determine if the third optical fibre 306 is sensing a strain that is so large that the third phase signal, $\phi_3(n)$, is subject to saturation. In the event that the third phase signal, $\phi_3(n)$, is determined to be deemed unsaturated, the signal analyser 606 communicates (Step 662) the acceptability of the third estimated phase signal, $\hat{\phi}_3(n)$, to the control unit 610.

However, in the event that the signal analyser 606 determines (Step 660) that the third phase signal, $\phi_3(n)$, is saturated, the signal analyser 606 proceeds to analyse the power of the second estimated phase signal, $\hat{\phi}_2(n)$, by comparing (Step 664) the power of frequency components of the second estimated phase signal, $\hat{\phi}_2(n)$, complying with the frequency band requirement with the power threshold value in order to determine if the second optical fibre 304 is sensing a strain that is so large that the second phase signal, $\phi_2(n)$, is subject to saturation. In the event that the second phase signal, $\phi_2(n)$, is determined (Step 664) to be unsaturated, the signal analyser 606 communicates (Step 666) the acceptability of the second estimated phase signal, $\hat{\phi}_2(n)$, to the control unit 610. However, in the event that the signal analyser 606 determines that the second phase signal, $\phi_2(n)$, is saturated, then the signal analyser 606 communicates (Step 668) the acceptability of the first estimated phase signal, $\hat{\phi}_1(n)$, to the control unit 610, which is the signal relating to the least sensitive of the first, second and third optical fibres 302, 304, 306.

Once one of the first, second or third estimated phase signals, $\hat{\phi}_1(n)$, $\hat{\phi}_2(n)$, $\hat{\phi}_3(n)$, has been selected by the signal analyser 606, the selected phase signal, $\hat{\phi}_s(n)$, constituting a phase signal fragment, is communicated to the strain signal estimator 612. The strain signal estimator 612 also receives from the control unit 610 an indication of the optical fibre with which the estimated phase signal, $\hat{\phi}_s(n)$, is associated. Once the strain signal estimator 612 has received an indication of the optical fibre with which the received selected unwrapped phase signal, $\hat{\phi}_s(n)$, is associated, the strain signal estimator 612 selects and applies (Step 670) an inverse transfer function, $f_1^{-1}(\ )$, to the estimated selected phase signal received, $\hat{\phi}_s(n)$, that corresponds to the optical fibre indicated. Consequently, for example, if the second estimated phase signal, $\hat{\phi}_2(n)$, was selected by the signal analyser 606, the strain signal estimator 612 applies the inverse of the second transfer function, $f_2^{-1}(\ )$, which corresponds to the second optical fibre 304, to the second estimated phase signal, $\hat{\phi}_2(n)$. The strain signal estimator 612 therefore outputs a strain estimate signal, $\hat{s}_w(n)$, in respect of the time window, w, currently being analysed.

In this example, the estimated strain signal $\hat{s}_w(n)$, is communicated (Step 672) to the signal combiner 614, which appends estimated strain signals received in order to reconstruct a contiguous estimated strain signal, ŝ(n).

The controller 610 then determines (Step 674) whether signals have been received in respect of time internals that still require analysis. In the event that further intervals remain to be analysed, the control unit advances (Step 676) a time interval pointer and the above process is repeated (Steps 658 to 674) until all remaining time intervals have been analysed. However, if no more time intervals remain to be analysed, the estimated strain signal, ŝ(n), is output on instruction of the controller 610 and the above processing ends.

The above example selects output signals in a piece-wise manner, finding the most appropriate output signal from amongst output signals respectively derived from a plurality of optical fibres. The time intervals employed can be selected depending upon application needs. In this example, the time interval is between about 0.05 s and about 0.1 s, or the time interval can be selected dynamically depending upon duration and/or severity of signal saturation.

It will be understood that the above disclosure provides many different embodiments, or examples, for implementing different features of various embodiments. Specific examples of components and arrangements are described above to simplify the present disclosure. These are, of course, merely examples and are not intended to be limiting. Indeed, variations to the above embodiments are contemplated. For example, although the above embodiments have been described in the context of active seismic surveying, the skilled person should appreciate that the apparatus and methods set forth herein can be employed in relation to passive seismic monitoring, for example microseismic activity detection, such as is sometimes employed in relation to hydraulic fracturing activities.

By way of further example, although the detectors of the above example operate in accordance with the hDVS technique, the skilled person should appreciate that the optical measurement system can employ other detections techniques in conjunction with the above examples, for example a DAS detection technique. As such, the phase-measuring OTDR system 200 described above should be understood to be an example of an optical measurement system.

In the above example, and as mentioned above, the coherent detection systems in combination with the respective sampling modules constitute optical signal converters. The examples set forth herein employ sampling of analogue IF current signals. However, the skilled person will appreciate that sampling, and hence conversion, of the electrical signal to the digital domain may take place after phase detection. In such circumstances, the optical signal converters do not include the sampling modules.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

In the above detailed description, embodiments are described in sufficient detail to enable those skilled in the art to practice the invention. It is to be understood that the various embodiments, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the spirit and scope of the invention. As mentioned above, the above detailed description is, therefore not to be taken in a limiting sense, and the scope of the present invention is defined only by the appended claims, appropriately interpreted, along with the full range of equivalents to which the claims are entitled.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The invention claimed is:

1. A method of processing strain measurement signals, the method comprising:
   receiving a first measured signal representing a first received backscattered optical signal in respect of a first sensor, the first measured signal having a first phase signal associated therewith;
   receiving a second measured signal representing a second received backscattered optical signal in respect of a second sensor, the second measured signal having a second phase signal associated therewith that constitutes a consolidation of the first phase signal and an additional phase signal, wherein the additional phase signal is present in and unrecoverable from the first measured signal;
   determining the first phase signal from the first measured signal;
   processing the first phase signal;
   determining the second phase signal from the second measured signal, wherein the first phase signal and the additional phase signal are inseparable from one another in the phase domain;
   processing the second phase signal to obtain the additional phase signal; and
   constructing a strain measurement signal using the processed first phase signal and the additional phase signal.

2. The method of claim 1, wherein the processing of the first phase signal is a phase unwrapping technique that yields an unwrapped first phase signal and the processing of the second phase signal employs an a priori phase signal.

3. The method of claim 2, wherein the a priori phase signal is the unwrapped first phase signal.

4. The method of claim 2, wherein processing of the second phase signal comprises subtracting the a priori phase signal from the determined second phase signal.

5. The method of claim 1, wherein the first measured signal has a first gain associated therewith and the second measured signal has a second gain associated therewith, wherein the second gain is larger than the first gain.

6. The method of claim 5, wherein the second gain is substantially a multiple of the first gain.

7. An optical measurement system comprising:
   a first optical signal converter arranged to receive, when in use, a first backscattered optical signal in respect of a first optical sensor and to generate a first measured signal in response thereto, the first measured signal having a first phase signal associated therewith;
   a second optical signal converter arranged to receive, when in use, a second backscattered optical signal in respect of a second optical sensor and to generate a second measured signal in response thereto, the second measured signal having a second phase signal associated therewith that constitutes a consolidation of the first phase signal and an additional phase signal, where the additional phase signal is present in and unrecoverable from the first measured signal;

a processing resource arranged to support a phase detector, the phase detector being arranged to determine the first phase signal from the first measured signal;

a phase processing unit supported by the processing resource and arranged to process the first phase signal; and a signal combiner; wherein the phase detector is arranged to determine the second phase signal from the second measured signal, wherein the first phase signal and the additional phase signal are inseparable from one another in the phase domain;

the phase processing unit is arranged to process the second phase signal to obtain the additional phase signal; and the signal combiner is arranged to construct a strain measurement signal using estimated strain signals respectively derived from the processed first phase signal and the additional phase signal.

8. The system of claim 7, wherein the phase processing unit is a phase unwrapper.

9. The system of claim 8, wherein the phase unwrapper is arranged to use an a priori phase signal.

10. The system of claim 9, wherein the first optical sensor has a first gain associated therewith and the second optical sensor has a second gain associated therewith, wherein the second gain is larger than the first gain.

11. The system of claim 10, wherein the second gain is substantially a multiple of the first gain.

* * * * *